United States Patent
Hyun

(10) Patent No.: US 9,411,493 B2
(45) Date of Patent: Aug. 9, 2016

(54) MOBILE TERMINAL AND CONTROL METHOD THEREOF

(75) Inventor: Juha Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 527 days.

(21) Appl. No.: 13/183,187

(22) Filed: Jul. 14, 2011

(65) Prior Publication Data
US 2012/0159364 A1    Jun. 21, 2012

(30) Foreign Application Priority Data

Dec. 15, 2010    (KR) ........................ 10-2010-0128268

(51) Int. Cl.
     *G06F 3/0481*      (2013.01)
     *G06F 3/0488*      (2013.01)
     *G06F 3/0483*      (2013.01)

(52) U.S. Cl.
     CPC ............ *G06F 3/0483* (2013.01); *G06F 3/0481* (2013.01); *G06F 3/0488* (2013.01); *G06F 3/04815* (2013.01); *G06F 2203/04804* (2013.01); *G06F 2203/04808* (2013.01)

(58) Field of Classification Search
     CPC . G06F 3/04815; G06F 3/0481; G06F 3/0483; G06F 3/0488; G06F 2203/04808; G06F 2203/04804
     USPC ................... 715/766, 790–797, 782; 345/173
     See application file for complete search history.

(56) References Cited

U.S. PATENT DOCUMENTS

| | | | |
|---|---|---|---|
| 5,060,135 A | | 10/1991 | Levine et al. |
| 5,422,993 A | * | 6/1995 | Fleming ........................ 715/835 |
| 5,530,865 A | * | 6/1996 | Owens et al. .................. 719/313 |
| 5,568,604 A | * | 10/1996 | Hansen ............... G06F 3/04883 715/835 |
| 5,745,096 A | * | 4/1998 | Ludolph et al. ................ 715/764 |
| 6,411,312 B1 | * | 6/2002 | Sheppard ....................... 715/769 |
| 7,562,312 B2 | * | 7/2009 | Rochford et al. .............. 715/848 |
| 7,694,233 B1 | * | 4/2010 | Ording .......................... 715/790 |

(Continued)

FOREIGN PATENT DOCUMENTS

EP      2068237 A2    6/2009

OTHER PUBLICATIONS

Wikipedia, "Stereoscopy", http://web.archive.org/web/20100709235114/http://en.wikipedia.org/wiki/Stereoscopy, http://en.wikipedia.org/wiki/Stereoscopy dated Jul. 9, 2010, printout pp. 1-13.*

(Continued)

*Primary Examiner* — Andrey Belousov
*Assistant Examiner* — William Wong
(74) *Attorney, Agent, or Firm* — Birch, Stewart, Kolasch & Birch, LLP

(57) ABSTRACT

According to an embodiment of the present invention, a mobile terminal includes a touch screen configured to display a user interface of a multi-layered structure, the user interface including at least one layer stack having a plurality of layers, a command input unit configured to receive a command from a user, and a controller configured to display a first layer of a first plurality of layers in the first layer stack on a first zone of the touch screen, display the first plurality of layers in a spread mode in response to a first command to enter the spread mode, and in the spread mode, change a location of the first layer on the touch screen to a second zone of the touch screen and display the first plurality layers of the first layer stack except for the first layer on a third zone of the touch screen.

12 Claims, 24 Drawing Sheets

(56) References Cited

U.S. PATENT DOCUMENTS

| | | | | |
|---|---|---|---|---|
| 8,214,760 | B2* | 7/2012 | Matthews et al. | 715/795 |
| 8,302,031 | B1* | 10/2012 | Sang | G06F 9/4443 715/782 |
| 2002/0171682 | A1* | 11/2002 | Frank et al. | 345/790 |
| 2002/0196284 | A1* | 12/2002 | Berquist et al. | 345/769 |
| 2003/0222915 | A1* | 12/2003 | Marion et al. | 345/769 |
| 2004/0027398 | A1* | 2/2004 | Jaeger | 345/863 |
| 2005/0091596 | A1* | 4/2005 | Anthony et al. | 715/712 |
| 2005/0210416 | A1* | 9/2005 | MacLaurin et al. | 715/851 |
| 2005/0242946 | A1* | 11/2005 | Hubbard et al. | 340/539.12 |
| 2006/0041846 | A1* | 2/2006 | Masselle et al. | 715/793 |
| 2006/0161861 | A1* | 7/2006 | Holecek et al. | 715/782 |
| 2006/0161867 | A1* | 7/2006 | Drucker et al. | 715/810 |
| 2007/0070066 | A1* | 3/2007 | Bakhash | 345/419 |
| 2007/0126732 | A1* | 6/2007 | Robertson et al. | 345/419 |
| 2008/0034013 | A1* | 2/2008 | Cisler et al. | 707/203 |
| 2008/0168401 | A1* | 7/2008 | Boule | G06F 3/04883 715/863 |
| 2008/0204424 | A1 | 8/2008 | Jin et al. | |
| 2008/0225007 | A1* | 9/2008 | Nakadaira et al. | 345/173 |
| 2008/0307335 | A1* | 12/2008 | Chaudhri et al. | 715/764 |
| 2008/0307345 | A1* | 12/2008 | Hart et al. | 715/769 |
| 2008/0307351 | A1* | 12/2008 | Louch et al. | 715/782 |
| 2009/0150775 | A1* | 6/2009 | Miyazaki et al. | 715/702 |
| 2009/0267909 | A1* | 10/2009 | Chen | G06F 3/04883 345/173 |
| 2009/0288032 | A1* | 11/2009 | Chang | G06F 3/04883 715/776 |
| 2009/0300511 | A1* | 12/2009 | Behar | G06F 1/163 715/745 |
| 2009/0322790 | A1* | 12/2009 | Behar | G06F 1/162 345/659 |
| 2010/0011316 | A1* | 1/2010 | Sar | G06F 9/4443 715/784 |
| 2010/0053355 | A1* | 3/2010 | Iwase et al. | 348/222.1 |
| 2010/0095240 | A1 | 4/2010 | Shiplacoff et al. | |
| 2010/0107101 | A1* | 4/2010 | Shaw et al. | 715/766 |
| 2010/0192081 | A1* | 7/2010 | Inoue et al. | 715/766 |
| 2010/0211872 | A1* | 8/2010 | Rolston et al. | 715/702 |
| 2010/0295789 | A1* | 11/2010 | Shin | G06F 1/1626 345/168 |
| 2010/0299598 | A1* | 11/2010 | Shin | G06F 3/0488 715/702 |
| 2010/0313165 | A1* | 12/2010 | Louch et al. | 715/792 |
| 2011/0029907 | A1* | 2/2011 | Bakhash | 715/769 |
| 2011/0047491 | A1* | 2/2011 | Hwang | G06F 3/0488 715/765 |
| 2011/0083106 | A1* | 4/2011 | Hamagishi | 715/836 |
| 2011/0291945 | A1* | 12/2011 | Ewing et al. | 345/173 |
| 2011/0296351 | A1* | 12/2011 | Ewing et al. | 715/841 |

OTHER PUBLICATIONS

Wikipedia, "Parallax barrier", http://web.archive.org/web/20100119221944/http://en.wikipedia.org/wiki/Parallax_barrier, http://en.wikipedia.org/wiki/Parallax_barrier dated Jan. 18, 2010, printout p. 1.*

* cited by examiner

FIG. 6
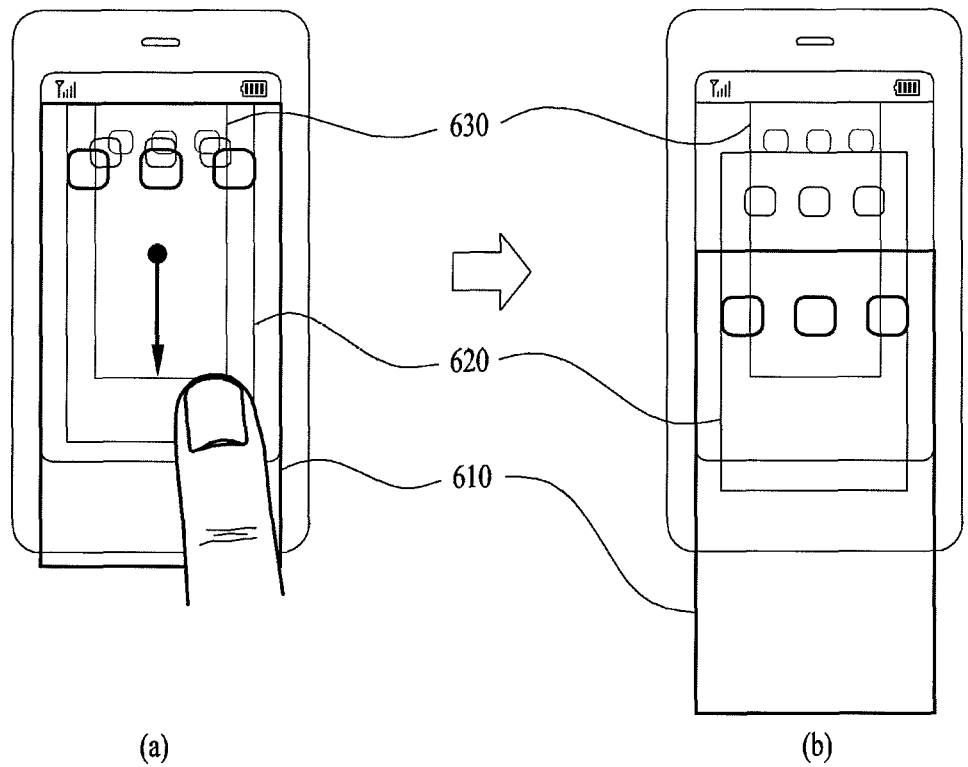
(a)    (b)
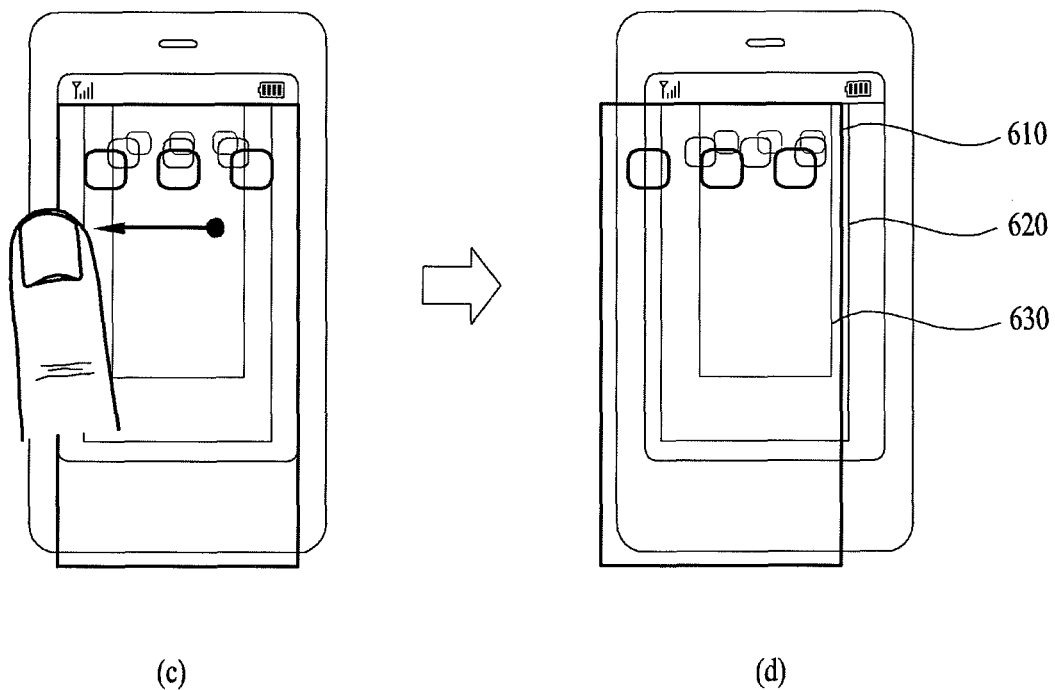
(c)    (d)

FIG. 13
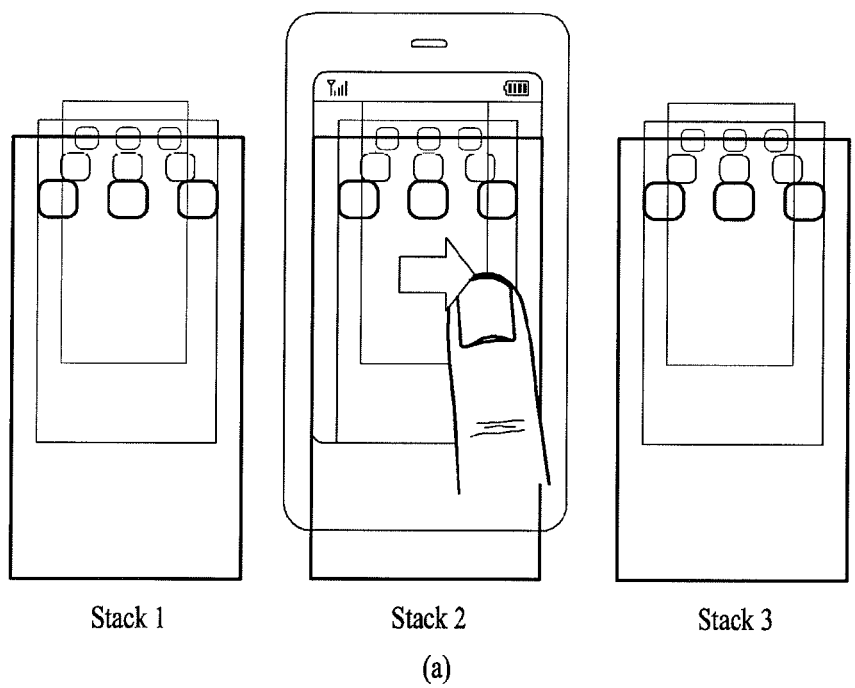
Stack 1　　　Stack 2　　　Stack 3
(a)
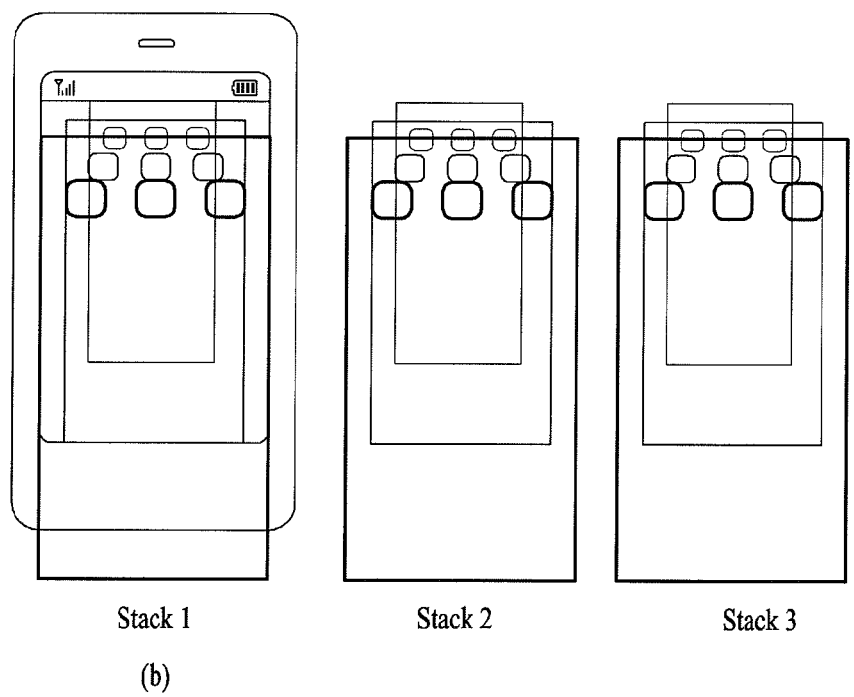
Stack 1　　　Stack 2　　　Stack 3
(b)

(a)　　　　　　　　　　　　　　(b)

(a)    (b)

FIG. 20
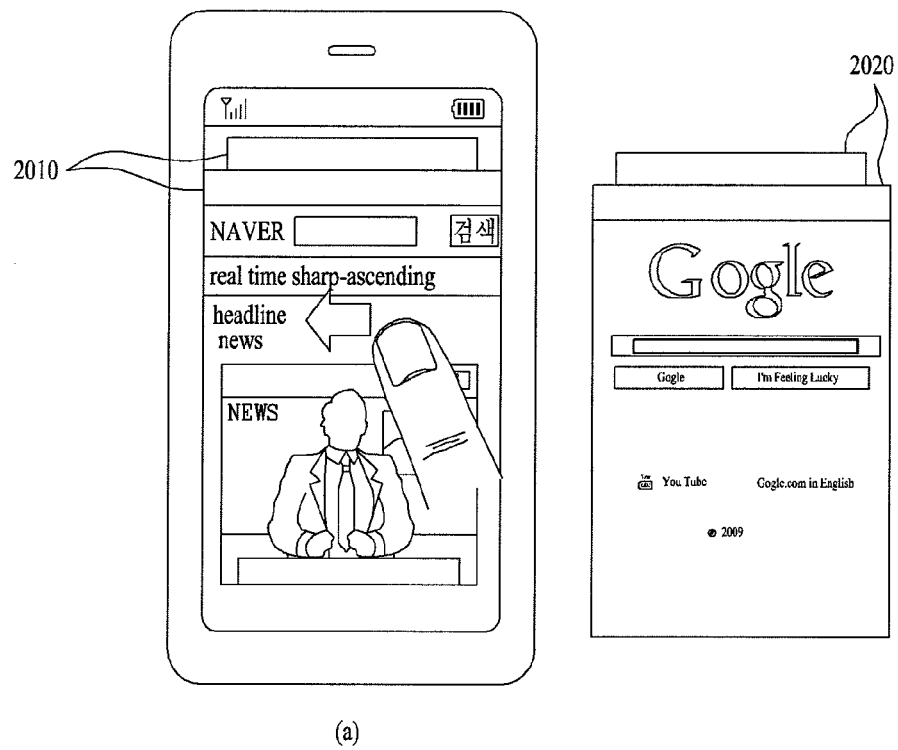
(a)
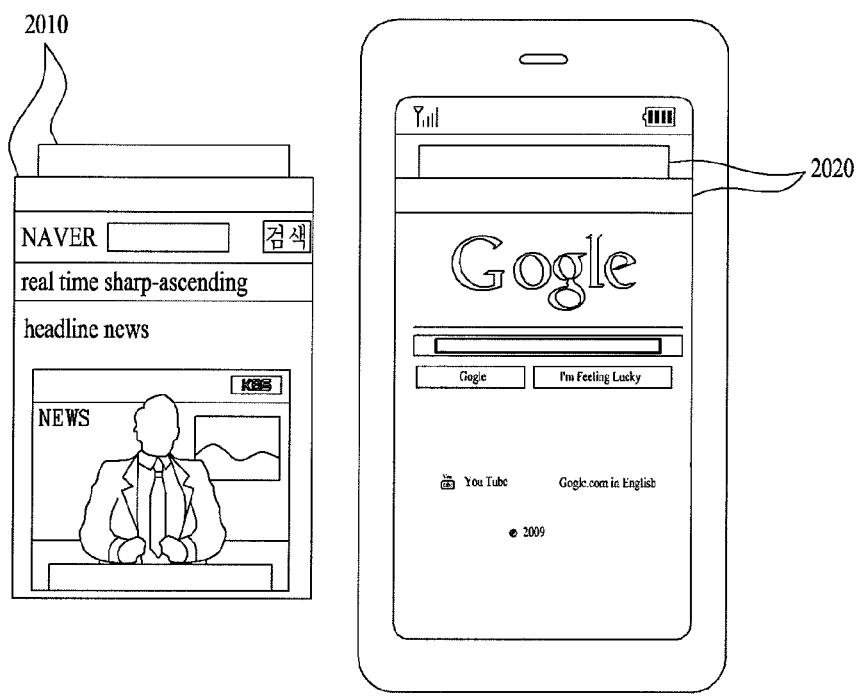
(b)

(a)          (b)

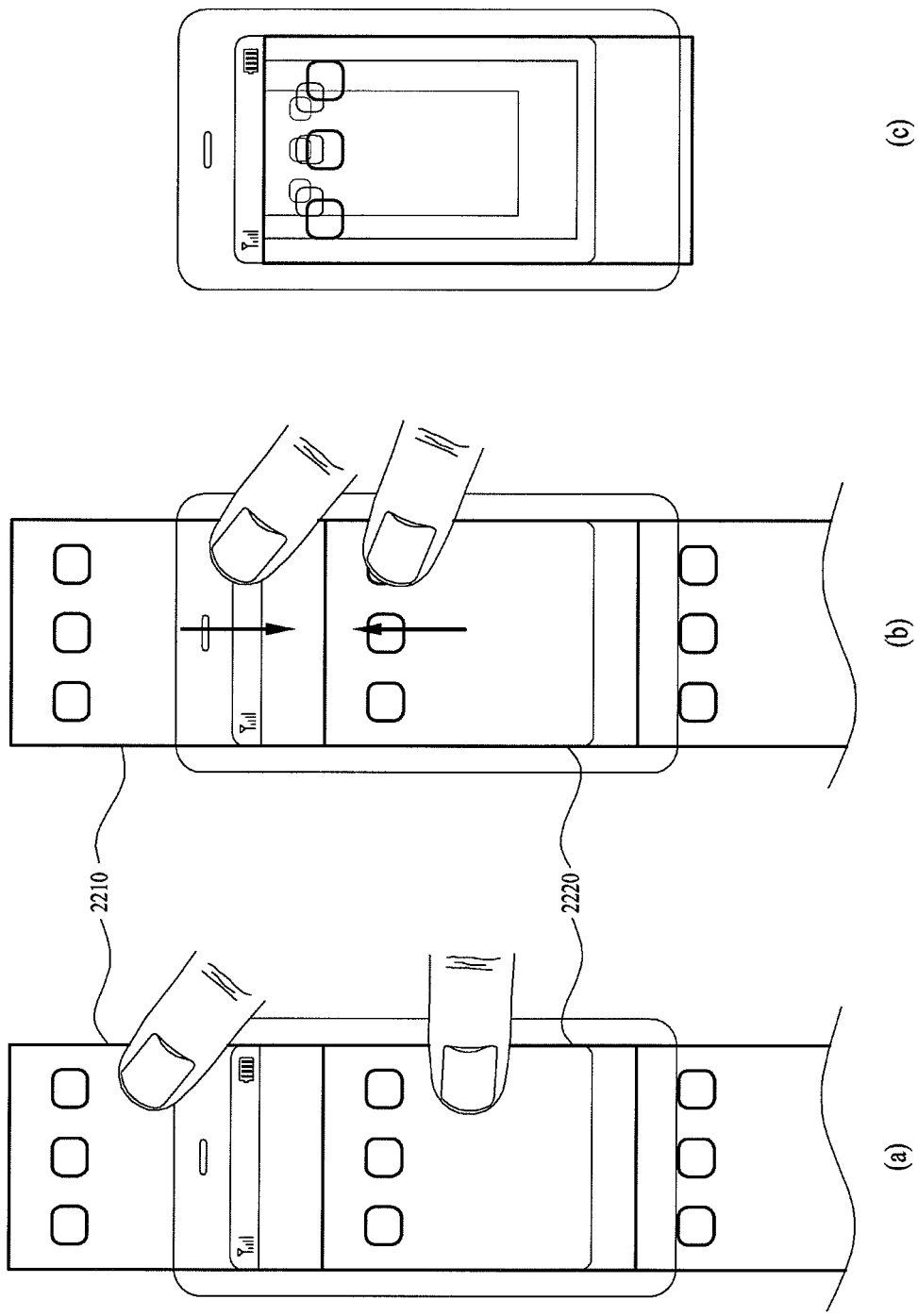

MOBILE TERMINAL AND CONTROL METHOD THEREOF

Pursuant to 35 U.S.C. §119(a), this application claims the benefit of earlier filing date and right of priority to Korean Patent Application No. 10-2010-0128268, filed on Dec. 15, 2010, the contents of which is hereby incorporated by reference herein in their entirety.

BACKGROUND OF THE INVENTION

1. Field of the Invention

The present invention relates to a mobile terminal and a control method thereof, which can provide a user interface to conveniently manipulate a menu screen of a multi-layered structure.

2. Discussion of the Related Art

Generally, terminals can be classified into mobile/portable terminals and stationary terminals depending on mobility. The terminals can be classified into handheld terminals and vehicle mount terminals again depending on whether a user can directly carry it.

As functions of the terminal are diversified, the terminal is implemented in the form of a multimedia player provided with composite functions such as photographing of photos or moving pictures, playback of music or moving picture files, game play, broadcast reception and the like.

To support and increase the aforementioned functions of the terminal, it may be able to consider the structural improvements and/or software improvements of the terminal.

It is a recent tendency that a mobile terminal, which provides a user interface, has been popularized, wherein the user interface allows a user to select a menu or execute an application by using an icon on a home screen displayed on a display unit. Generally, the home screen includes a plurality of pages, and as a user frequently changes arrangement of the icon in association with other page, a user interface that can execute the arrangement of the icon more conveniently is required.

SUMMARY OF THE INVENTION

Accordingly, the present invention is directed to a mobile terminal and a control method thereof, which substantially obviate one or more problems due to limitations and disadvantages of the related art.

An object of the present invention is to provide a more convenient user interface of a mobile terminal.

Another object of the present invention is to provide a control method and an apparatus for performing the control method, in which a layer arrangement structure and an icon arrangement structure can be changed conveniently in a user interface of a multi-layered structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention comprises a touch screen for displaying a user interface of a multi-layered structure, the user interface including at least one layer stack having at least one layer; a command input means for inputting a command from a user; and a controller displaying a first layer of a first layer stack in a first zone on the touch screen, and displaying the first layer stack in the first zone on the touch screen in a spread mode if a first command is input, wherein the spread mode changes a location of the first layer on the touch screen to correspond to the first command, and displays at least one layer except for the first layer among a plurality of layers in a second zone, which is generated as the location of the first layer is changed, at a spacing interval corresponding to the first input, and the plurality of layers are arranged on a virtual stereoscopic space with predetermined three-dimensional (3D) depths in a stacked form.

In another aspect of the present invention, a control method of a mobile terminal comprises the steps of a) displaying a first layer of a first layer stack, which includes a plurality of layers, in a first zone on a touch screen; b) changing a location of the first layer on the touch screen to correspond to a first command input; c) displaying at least one layer except for the first layer among the plurality of layers in a second zone, which is generated as the location of the first layer is changed, at a spacing interval corresponding to the first input; and d) displaying a second layer of the plurality of layers in the first zone in accordance with a second command input, wherein the plurality of layers are arranged on a virtual stereoscopic space with predetermined three-dimensional (3D) depths in a stacked form.

The mobile terminal according to the aforementioned embodiments of the present invention can provide a user interface of a multi-layered structure, which can change arrangement of the icon conveniently.

Also, in the user interface of a multi-layered structure, the user can change or recover arrangement of the layers by identifying a layer arrangement state conveniently.

According to an embodiment of the present invention, a mobile terminal includes a touch screen configured to display a user interface of a multi-layered structure, the user interface including at least one layer stack having a plurality of layers, a command input unit configured to receive a command from a user, and a controller configured to display a first layer of a first plurality of layers in the first layer stack on a first zone of the touch screen, display the first plurality of layers in a spread mode in response to a first command to enter the spread mode, and in the spread mode, change a location of the first layer on the touch screen to a second zone of the touch screen and display the first plurality layers of the first layer stack except for the first layer on a third zone of the touch screen.

According to an embodiment of the present invention, a control method of a mobile terminal includes displaying, on a first zone of a touch screen of the mobile terminal, a first layer of a plurality layers of a layer stack, receiving, via the touch screen, a first command input, changing a location of the first layer on the touch screen to a second zone of the touch screen in response to the first command input, generating a third zone on the touch screen in response to the first command input, displaying, on the touch screen, at least one layer of the plurality of layers except the first layer in the third zone, the displayed at least one layer and the first layer being spaced apart from each other at a spacing interval corresponding to the first command input, receiving, via the touch screen, a second command input to display a second layer of the plurality of layers displayed in the third zone in the first zone, and displaying, on the touch screen, the second layer in the first zone in accordance with the second command input, wherein the plurality of layers are arranged on a virtual stereoscopic space with predetermined three-dimensional (3D) depths in a stacked form.

According to an embodiment of the present invention, a control method of a mobile terminal includes displaying, on a first zone of a touch screen of the mobile terminal, a first layer of a plurality layers of a layer stack, receiving, via the touch screen, a first command input to enter a spread mode, changing a location of the first layer on the touch screen to a second zone of the touch screen in the spread mode in accordance with the first command input, generating a third zone on the touch screen in the spread mode, displaying, on the touch screen, the plurality of layers except the first layer in the third zone, the plurality of layers being spaced apart from each other at a spacing interval in the spread mode, receiving, via the touch screen, a second command input to display a second layer of the plurality of layers displayed in the third zone in the first zone in the spread mode, displaying, on the touch screen, the second layer in the first zone in accordance with the second command input in the spread mode, and receiving, via the touch screen, a third command input to end the spread mode, wherein the plurality of layers are arranged on a virtual stereoscopic space with predetermined three-dimensional (3D) depths in a stacked form.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 6 illustrates an example of an entry method of a spread mode according to one embodiment of the present invention;

FIG. 13 illustrates an example of a scroll type of a layer stack unit according to one embodiment of the present invention;

FIG. 20 illustrates another example of the spread mode applied to a web browser application in accordance with one embodiment of the present invention;

FIG. 22 illustrates another example of a method of ending the spread mode according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
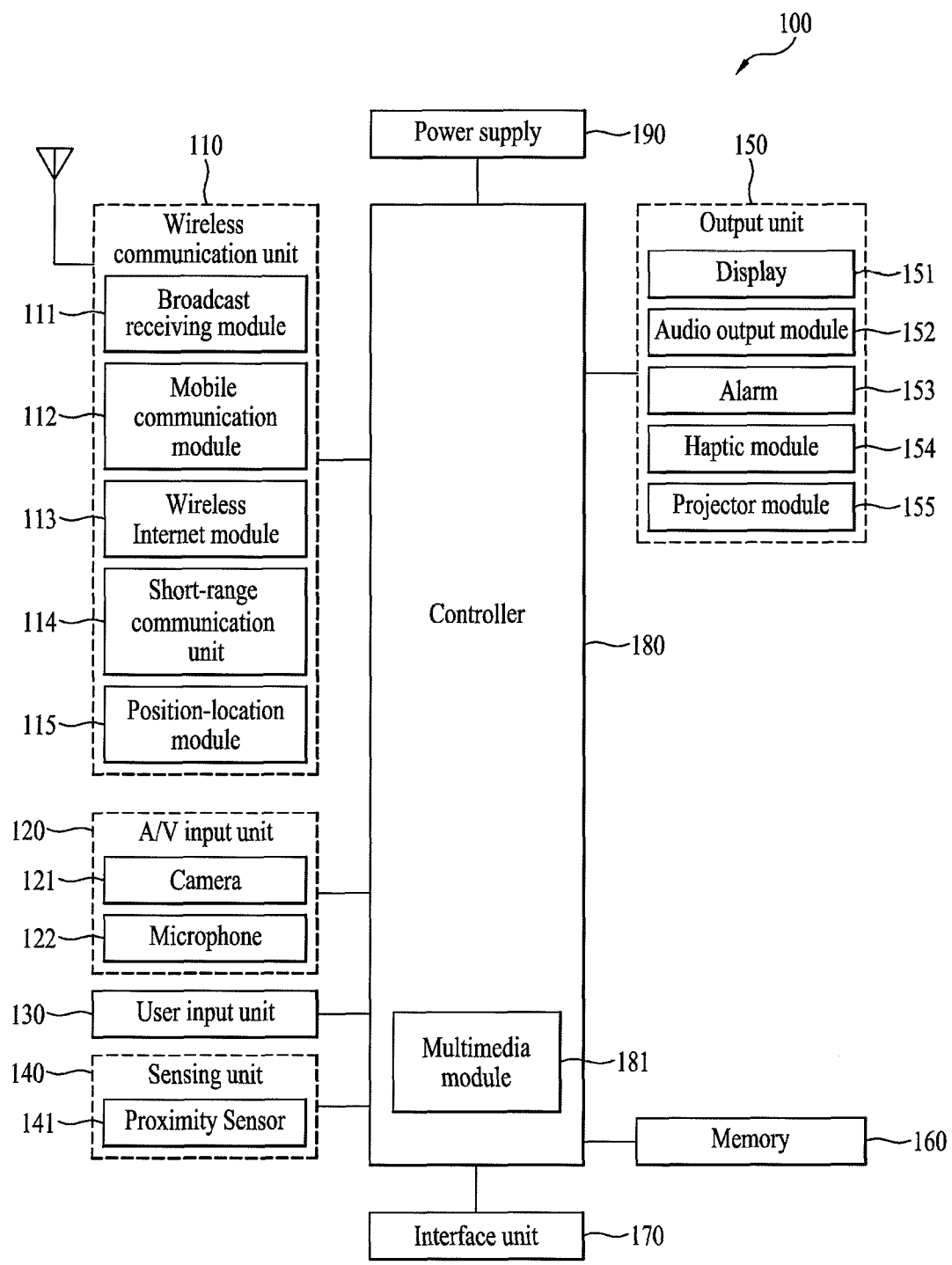
FIG. 1 is a block diagram illustrating a mobile terminal according to one embodiment of the present invention.

FIG. 1 is a block diagram of a mobile terminal 100 in accordance with an embodiment of the present invention.

FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), WIBRO (Wireless broadband), WIMAX (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as BLUETOOTH and ZIGBEE, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
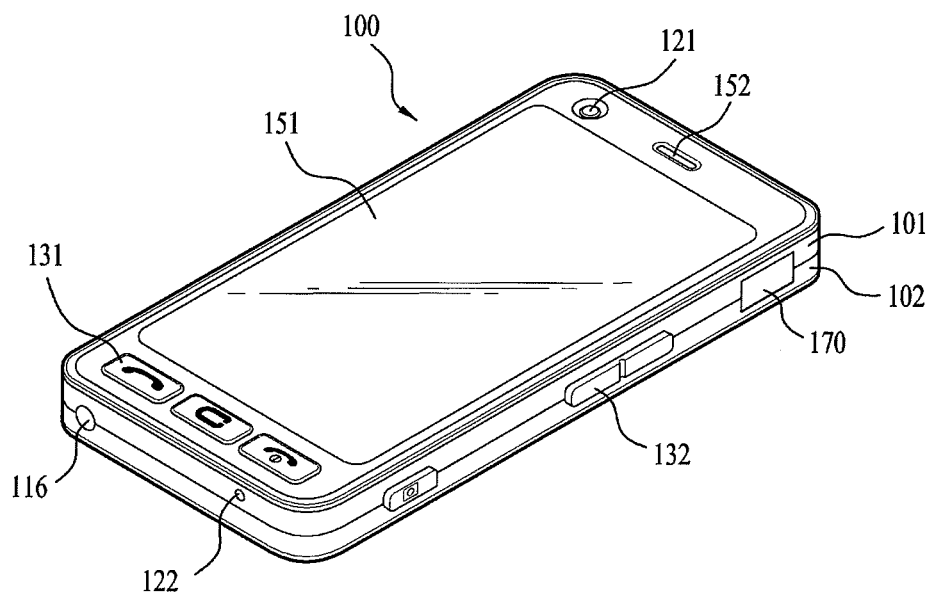
FIG. 2 is a front perspective view illustrating a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
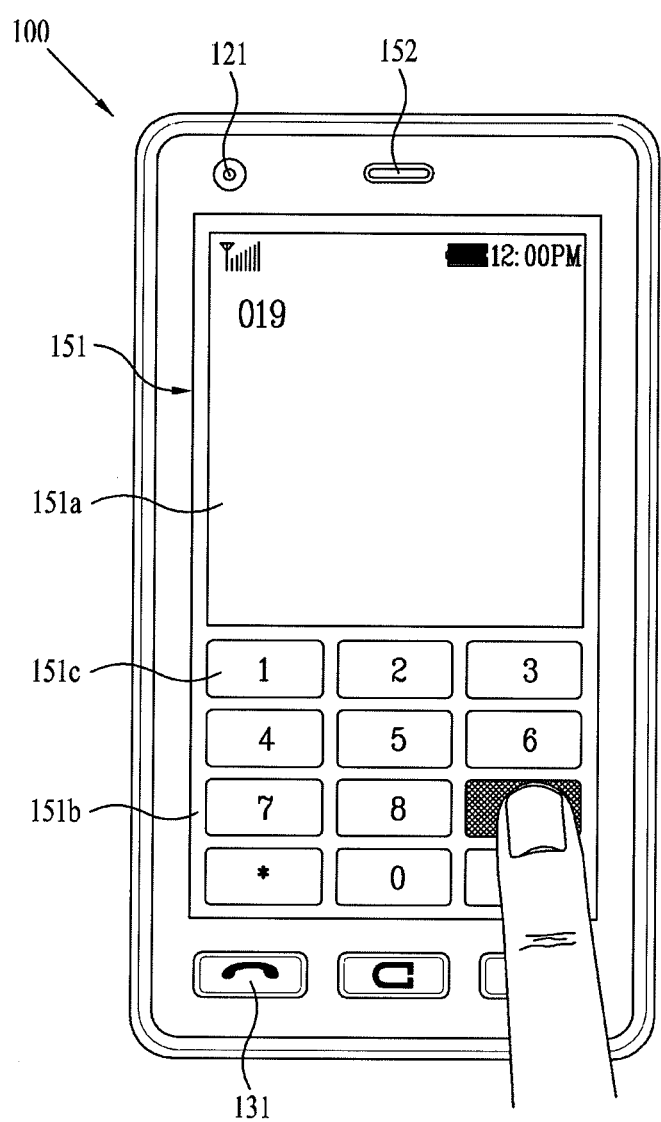
FIG. 3 is a front view illustrating an operation state of a mobile terminal according to the present invention.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is inputted through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

The mobile terminal according to the present invention, which will be described later, includes, but not limited to, at least one of the aforementioned elements or modules described with reference to FIG. 1. The mobile terminal may include more elements or modules or less elements or modules than those of FIG. 1. For convenience, it is assumed that the display module 151 of the mobile terminal 100 according to the present invention is a touch screen. The mobile terminal according to the present invention can provide a user interface based on multiple layers. Hereinafter, a multi-layered structure constituting a user interface that can be applied to the embodiments of the present invention will be described.

The layer means one plane having a predetermined area, and one or more icons and/or widgets can be arranged on each layer in an application, such as a home screen (background image) or a file explorer, which arranges and displays objects. In this case, one icon may represent one file, or may perform a shortcut function on a specific file, application or menu. In addition, all or some of a run screen of the application may be displayed on the layer.

It is general that the layer corresponds to the size of the display module of the mobile terminal. Alternatively, the size of the layer may exclude a zone corresponding to an indicator zone and/or a dock bar, wherein the indicator zone is arranged on the display module to briefly indicate time, battery state, or action state, and the dock bar fixedly arranges a frequently used icon. The size of the layer is set exemplarily without limitation to the aforementioned size. The size of the layer may be greater or smaller than the display module, or may have a predetermined thickness not the plane.

Multi-Layered Structure

First of all, a layer structure applied to the embodiments of the present invention will be described with reference to FIG. 4.

Figure 4A:
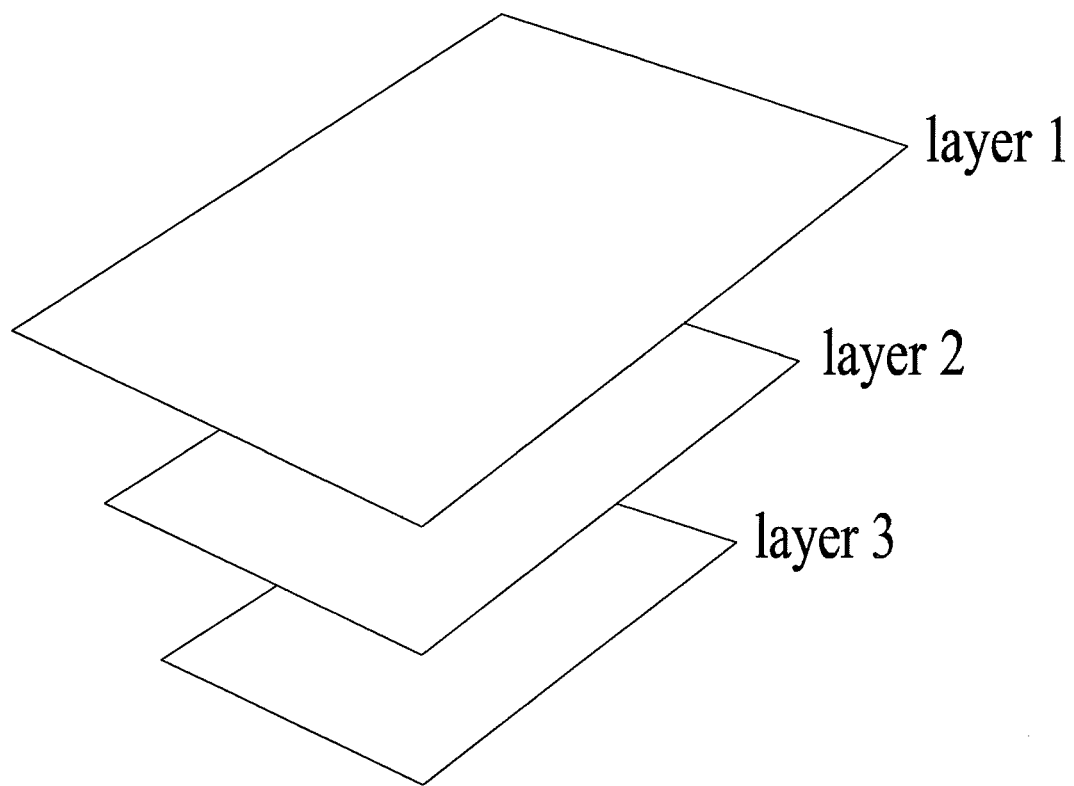
FIGS. 4a to 4c illustrate examples of a layer arrangement structure applied to the embodiments of the present invention.
Figure 4B:
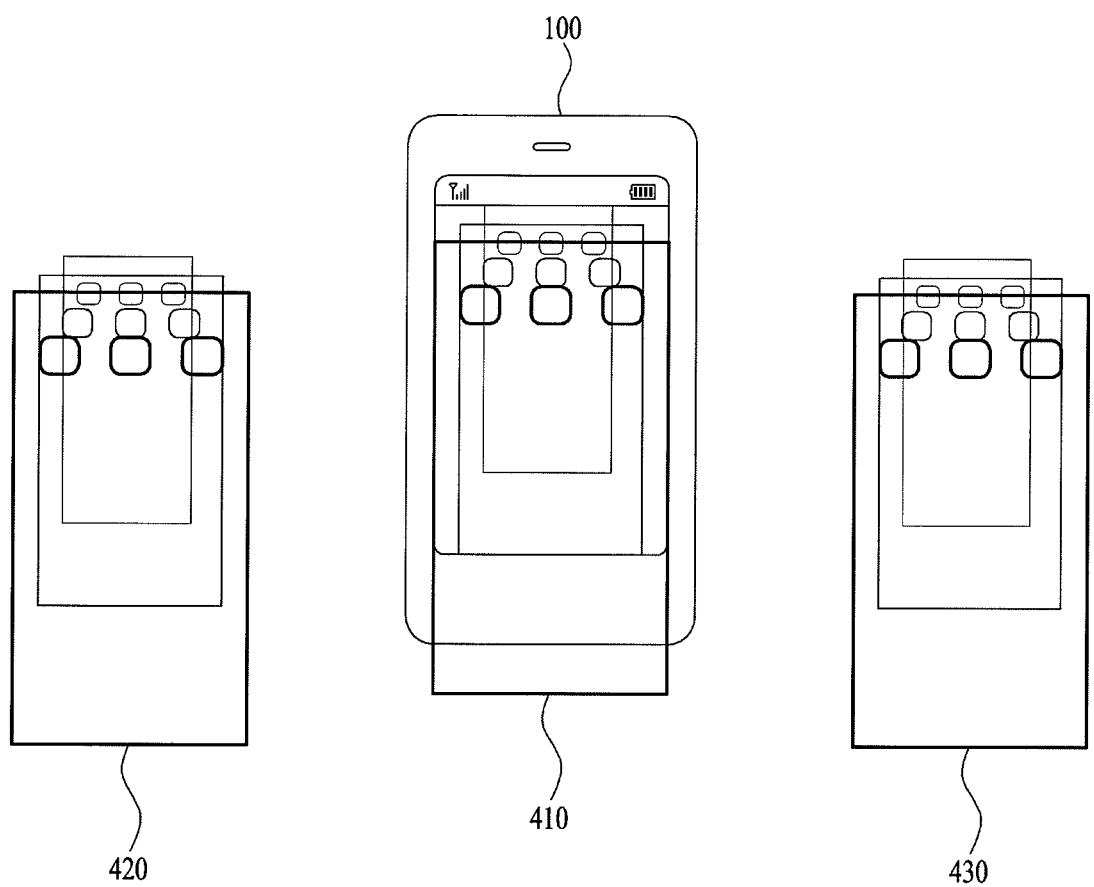
Figure 4C:
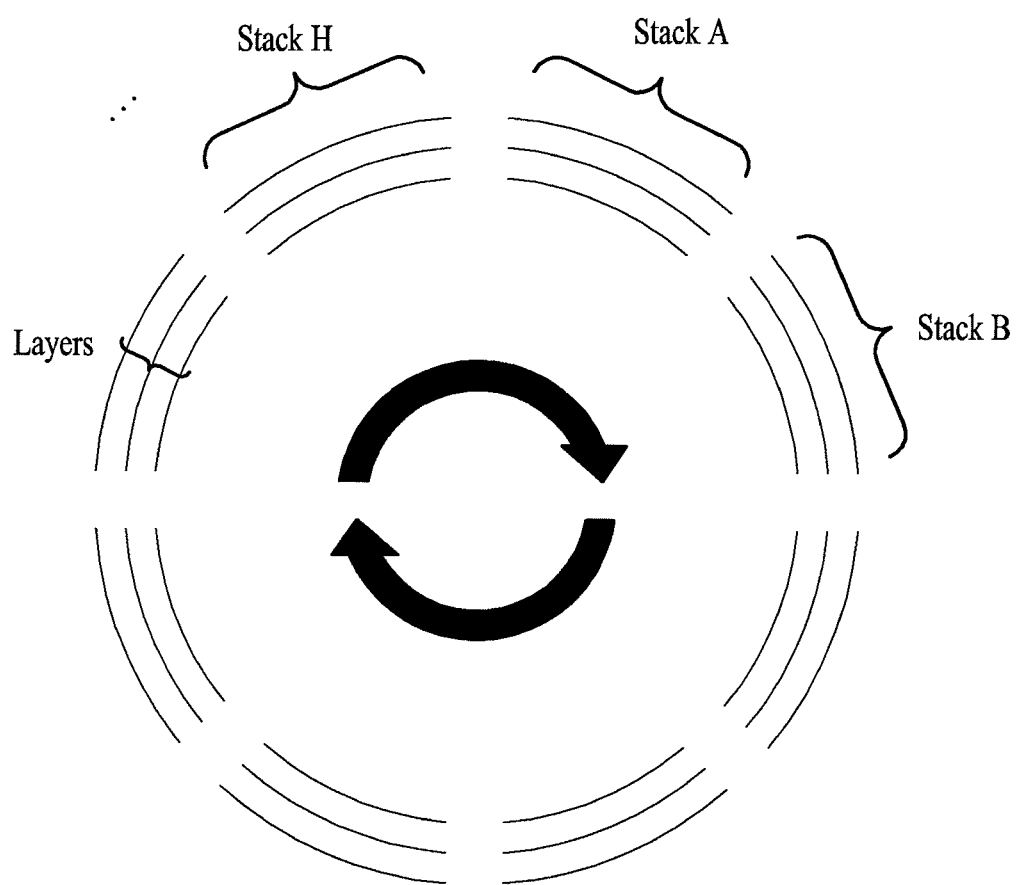

FIGS. 4a to 4c illustrate examples of a layer arrangement structure applied to the embodiments of the present invention.

Referring to FIG. 4a, a total of three layers from layer 1 to layer 3 can be arranged on a virtual stereoscopic space in a stacked form with a predetermined interval. If the layers are displayed on the display module, the user's sight is preferably directed from the layer 3 to the layer 1.

When the layers are displayed in a 3D stereoscopic image through the display module 151, they have a low 3D depth to allow the user to feel that the layer 1 is located on the uppermost and the layers are close to the user. Also, the layers have a high 3D depth in such a manner that an arrangement height is gradually lowered towards the layer 3 through the layer 2 to allow the user to feel that the layers are far away from the user. In this case, the 3D stereoscopic image means an image displayed using a stereoscopic technique that provides an image obtained by viewing a plane/stereoscopic object from each sight of the user's left eye and right eye. In order to implement the stereoscopic technique, the display module may be provided with a parallax generator such as lenticular or parallax barrier.

Even though the layers are not displayed in a 3D stereoscopic image, their size and arrangement can be controlled properly to allow the user to feel perspective or upper and lower relation among the layers. For example, the layer located at an upper portion (towards layer 1 from layer 3 in FIG. 4*a*) is displayed with a great range, and the layer located at a lower portion is displayed with a small range, whereby perspective equivalent to 3D depth may be given or the upper and lower relation among the layers may be expressed.

In the aforementioned layer structure, each layer may be set with predetermined transparency. For example, if all the layers are set with semi-transparency, the user can view all the surfaces of the layers from the layer 1 to the layer 3. If only the layer 2 is set opaquely, the user can only view the surface of the semi-transparent layer 1 and the surface of the layer 2 by transmitting the semi-transparent layer 1, and may not view the layer 3. As a result, if transparency is not given to each layer, the layer located on the uppermost is only displayed on the display module.

Also, the arrangement location, order and/or 3D depth of the layers may be changed through a predetermined command input through the user input module. A command input for manipulating the layers can be performed through a camera 121 for taking a location of a pointer, a proximity sensor 140 for recognizing a proximity distance of the pointer, and a touch screen 151 that can recognize contact touch and proximate touch separately. A detailed method of the command input will be described later.

In this specification, a layer group of stacked layers as illustrated in FIG. 4*a* will be referred to as a "layer stack".

The user interface based on multiple layers that can be applied to the embodiments of the present invention can include a plurality of layer stacks. Each stack can be arranged to adjoin or connect with the other stacks.

For example, three layer stacks 410 to 430 may be arranged to adjoin one another in a horizontal direction as illustrated in FIG. 4*b*. In this case, it is assumed that the size of one layer constituting the stack corresponds to that of the touch screen and an image corresponding to one stack is output through the touch screen once to display the center stack 410 on the touch screen. At this time, the user performs a flicking touch input in a right direction so that the center stack is scrolled to the right side and the left stack 420 is displayed on the touch screen. If the user performs the flicking touch input in a right direction once again when the left stack 420 is displayed on the touch screen, since there is no stack at the left side of the left stack 420, scroll does not occur.

However, if stacks A to H are arranged in a circulating structure as illustrated in FIG. 4*c*, the stacks are circulated in a flicking input direction, and each stack is displayed on the touch screen.

The arrangement type of the aforementioned layer stacks is exemplary, and various stack arrangement types can be applied to the present invention without limitation to the aforementioned arrangement type. For example, the stacks may be connected with one another in a vertical direction, or in a lattice form of horizontal and vertical directions. Also, the stacks may be arranged between respective sublayers of the same layer at a predetermined interval, or may be connected with one another in a contact type.

The user interface of the aforementioned multi-layered structure can include a plurality of layer stacks, each of which includes a plurality of layers. Also, at least one icon, widget or application execution zone may be arranged on each layer.

Accordingly, a method of conveniently identifying and changing an arrangement state of layers included in the user interface of the multi-layered structure or an image or object displayed through the layers will be required.

To this end, one embodiment of the present invention suggests that layers constituting a layer stack are displayed by being spaced apart from one another at a predetermined interval (referred to as "spread mode"), and in this state, the arrangement state of the layers and/or icon is identified and changed.

Hereinafter, a method of changing an arrangement state of each layer or icon arranged in each layer in the aforementioned user interface of a multi-layered structure according to the present invention will be described with reference to FIG. 5.

Figure 5:
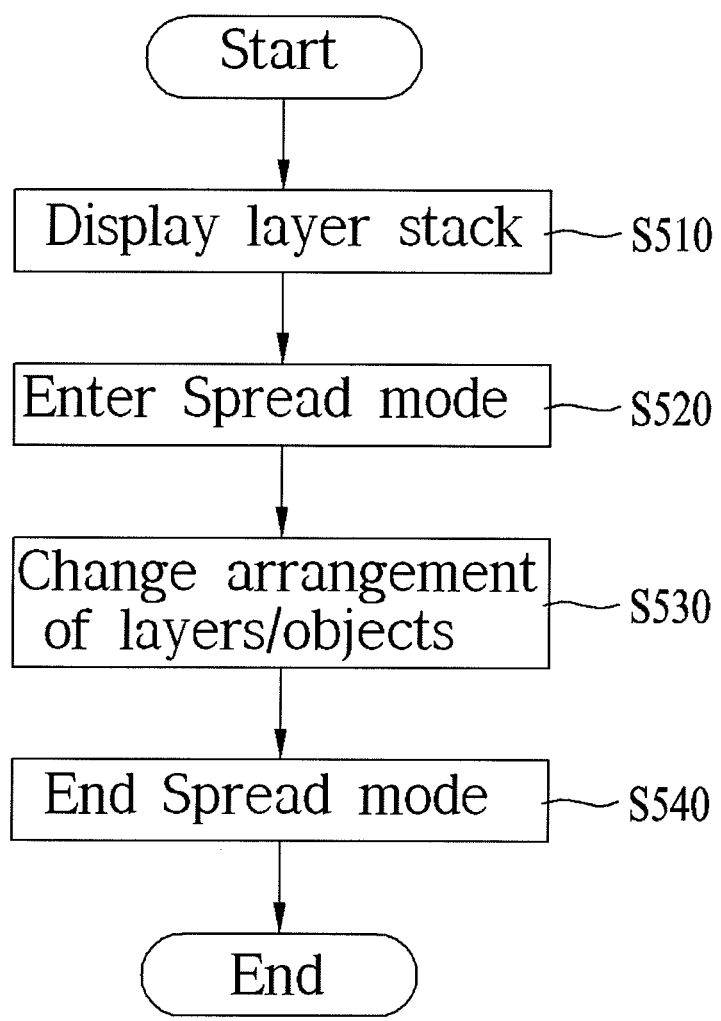
FIG. 5 is a flow chart illustrating an example of a control method of a user interface of a multi-layered structure according to one embodiment of the present invention.

FIG. 5 is a flow chart illustrating an example of a control method of a user interface of a multi-layered structure according to one embodiment of the present invention.

Referring to FIG. 5, an image of a specific layer stack is displayed on the touch screen (S510).

At this time, the specific layer stack may be a layer stack that includes layers constituting a home screen (background image), or may be a layer stack that includes layers for displaying an execution image of an application displayed by inputting a predetermined command through the user. In this case, if semi-transparency effect is not applied to each layer constituting the corresponding layer stack, an image of the uppermost layer is displayed on the touch screen. If semi-transparency effect is applied to each layer constituting the corresponding layer stack, the image of the uppermost layer and images of lower layers are together displayed on the touch screen.

In accordance with a command input from the user onto the user input module 130 or the touch screen 151 in a state that the specific layer stack is displayed, the controller 180 can enter the spread mode (S520).

The spread mode means a mode for displaying layers constituting the layer stack by spacing them apart from one another at a predetermined interval as described above. A detailed method of inputting a command for entering the spread mode and a detailed arrangement type of layers in the spread mode will be described later.

The user can identify the layers and/or an object of icon provided in the layers through the spread mode. The controller 180 can conveniently change the arrangement state of the layers and/or the object provided in the layers in response to the command input from the user (S530).

Afterwards, as the user inputs a command for ending the spread mode, the controller 180 can change the spaced state of the layers to the original state (i.e., return to general mode) by ending the spread mode.

Entry Method of Spread Mode and Layer Arrangement Type in Spread Mode

Hereinafter, an entry method of the spread mode and a layer arrangement type in the spread mode will be described with reference to FIGS. 6 to 8.

FIG. 6 illustrates an example of an entry method of the spread mode according to one embodiment of the present invention.

In the following drawings including FIG. 6, it is assumed that semi-transparency effect is applied to a layer stack of three layers and the three layers are displayed on the touch screen. The layer stack is exemplary, and the layer stack according to the present invention can include layers more or less than the three layers. Also, to assist concise understanding, image/object displayed on each layer may be replaced with a simple diagram or may be omitted, and a portion below the touch screen of the mobile terminal will be omitted in some drawings. Moreover, although the layers constituting the layer stack may be arranged beyond the touch screen of the mobile terminal depending on the arrangement state in some drawings, this is to represent a relative location of each layer arranged on a virtual space, and the layers are actually displayed as much as a zone overlapped with the touch screen.

First of all, referring to (a) of FIG. 6, the layers are displayed on the touch screen with a smaller range (reduced at a predetermined rate) towards the lowest layer 630 from the highest layer 610. At this time, the spread mode can be initiated in such a manner that the respective layers are downwardly spaced apart from one another as much as the distance corresponding to touch-drag or flicking input from the user in a downward direction on the touch screen. In other words, the highest layer moves as much as the distance dragged in an input direction of touch-drag, and the layers are arranged with movement of the distance shorter than the drag distance as much as a predetermined rate towards the lower layer from the highest layer.

Unlike (a) of FIG. 6, if there is touch-drag or flicking input in a horizontal direction as illustrated in (c) of FIG. 6, the spread mode may be initiated in such a manner that the respective layers are spaced apart from one another in a corresponding input direction as illustrated in (d) of FIG. 6. However, it is preferable that this method is used when no layer stack is arranged at both sides of a specific layer stack or when flicking input in a horizontal direction is not scroll command to another layer stack.

Next, control of the spacing interval of the respective layers in the spread mode to correspond to the user input for spread mode entry will be described with reference to FIG. 7.

Figure 7:
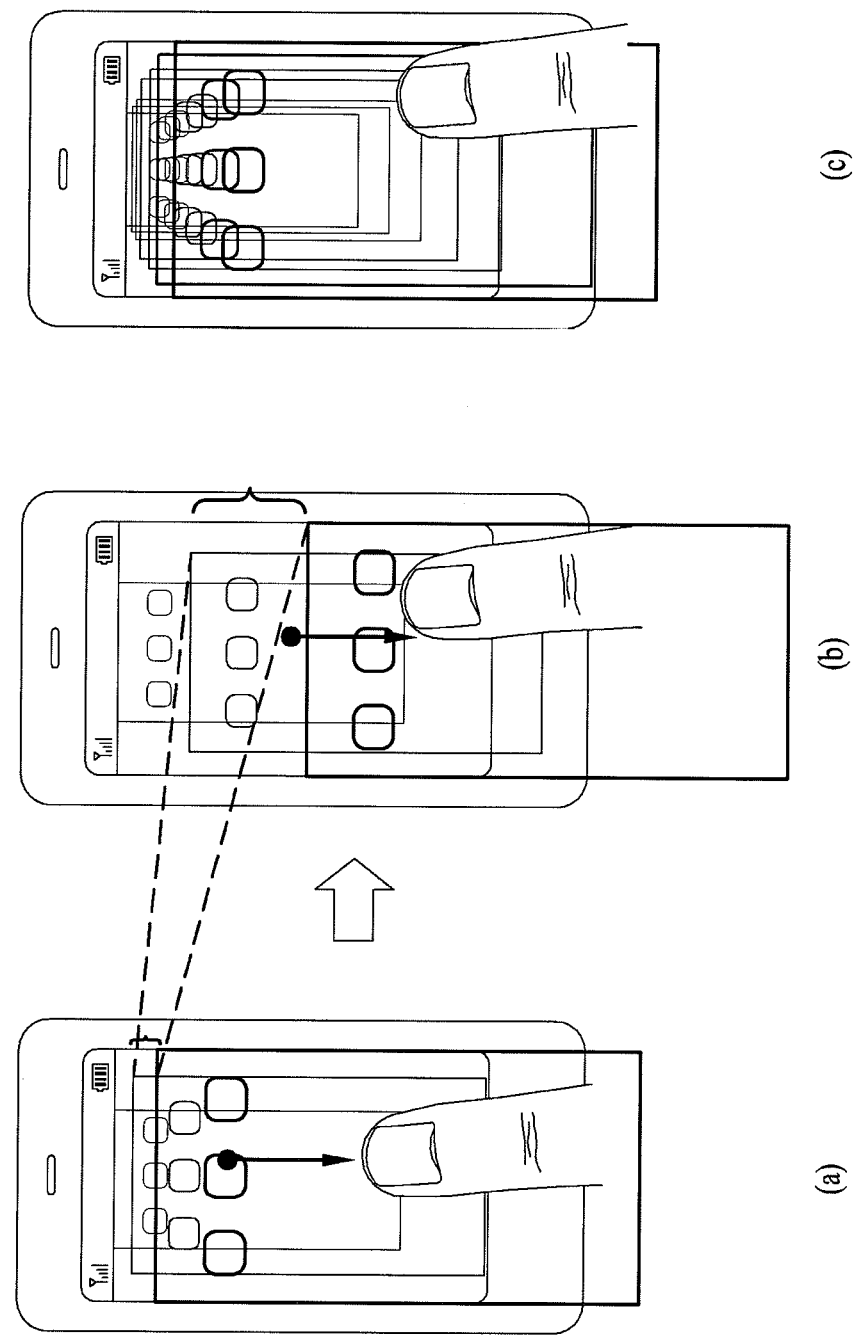
FIG. 7 illustrates an arrangement interval of layers based on a drag distance for spread mode entry.

FIG. 7 illustrates an arrangement interval of layers based on a drag distance for spread mode entry.

In FIG. 7, it is assumed that a method of inputting a user command for spread mode entry and the spread mode display type based on the method follow the method of (a) and (b) of FIG. 6. At this time, if the drag distance is short as illustrated in (a) of FIG. 7, the interval between the respective layers constituting the corresponding layer stack is displayed on the spread mode with a narrow range. If the drag distance becomes longer as illustrated in (b) of FIG. 7, the interval between the respective layers constituting the corresponding layer stack is displayed on the spread mode with a wide range. In other words, if the drag distance for entering the spread mode is long, the distance between the respective layers displayed in the spread mode is increased. Even if the drag distance is uniform as illustrated in (c) of FIG. 7, the interval between the respective layers may be variable depending on the number of layers constituting the corresponding layer stack.

In the mean time, if the drag input for spread mode entry exceeds a previously set distance, the respective layers constituting the corresponding stack are fully spread out in a touch-drag input direction, whereby the layers may be displayed on the same plane. This will be described with reference to FIG. 8.

Figure 8:
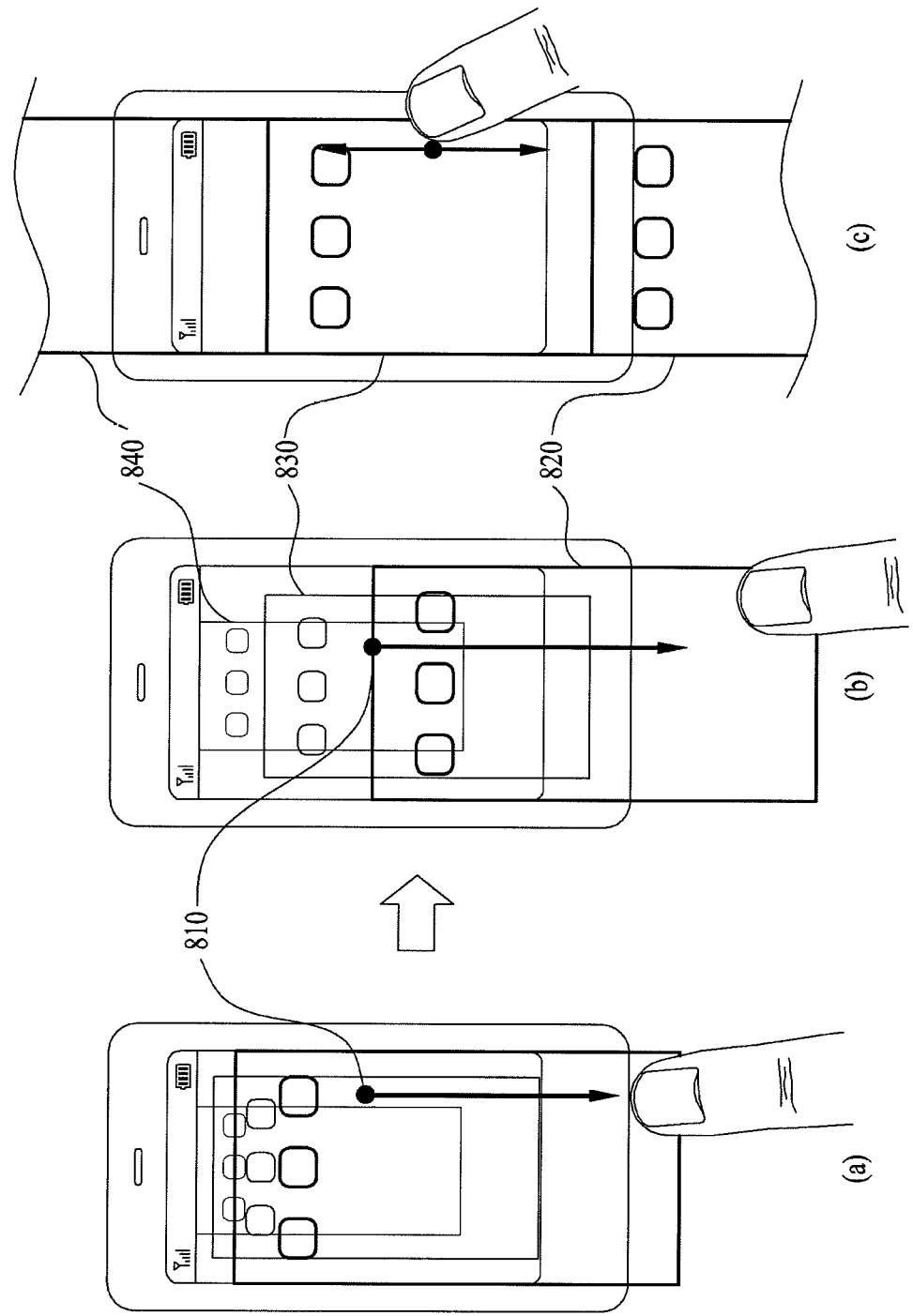
FIG. 8 illustrates an example of a display type of the spread mode according to one embodiment of the present invention.

FIG. 8 illustrates an example of a display type of the spread mode according to one embodiment of the present invention.

First of all, referring to (a) of FIG. 8, the user can display the highest layer 820 and its lower layers 830 and 840 to be spaced apart from one another at a predetermined interval as illustrated in (b) of FIG. 8 by giving drag input to one point 810 of the highest layer 820 for spread mode entry. At this time, if the distance of drag input exceeds the previously set distance, the respective layers can be displayed in such a manner that they are connected with one another in a vertical direction on the same plane (for example, plane where the highest layer is located) as illustrated (c) of FIG. 8. In this state, the lower layers are not covered by the highest layer but displayed on the touch screen, and the user can scroll the layers through flicking touch input in upper/lower directions.

Arrangement State Change of Layers

Hereinafter, methods of changing an arrangement state of each layer in the aforementioned spread mode will be described.

Figure 9:
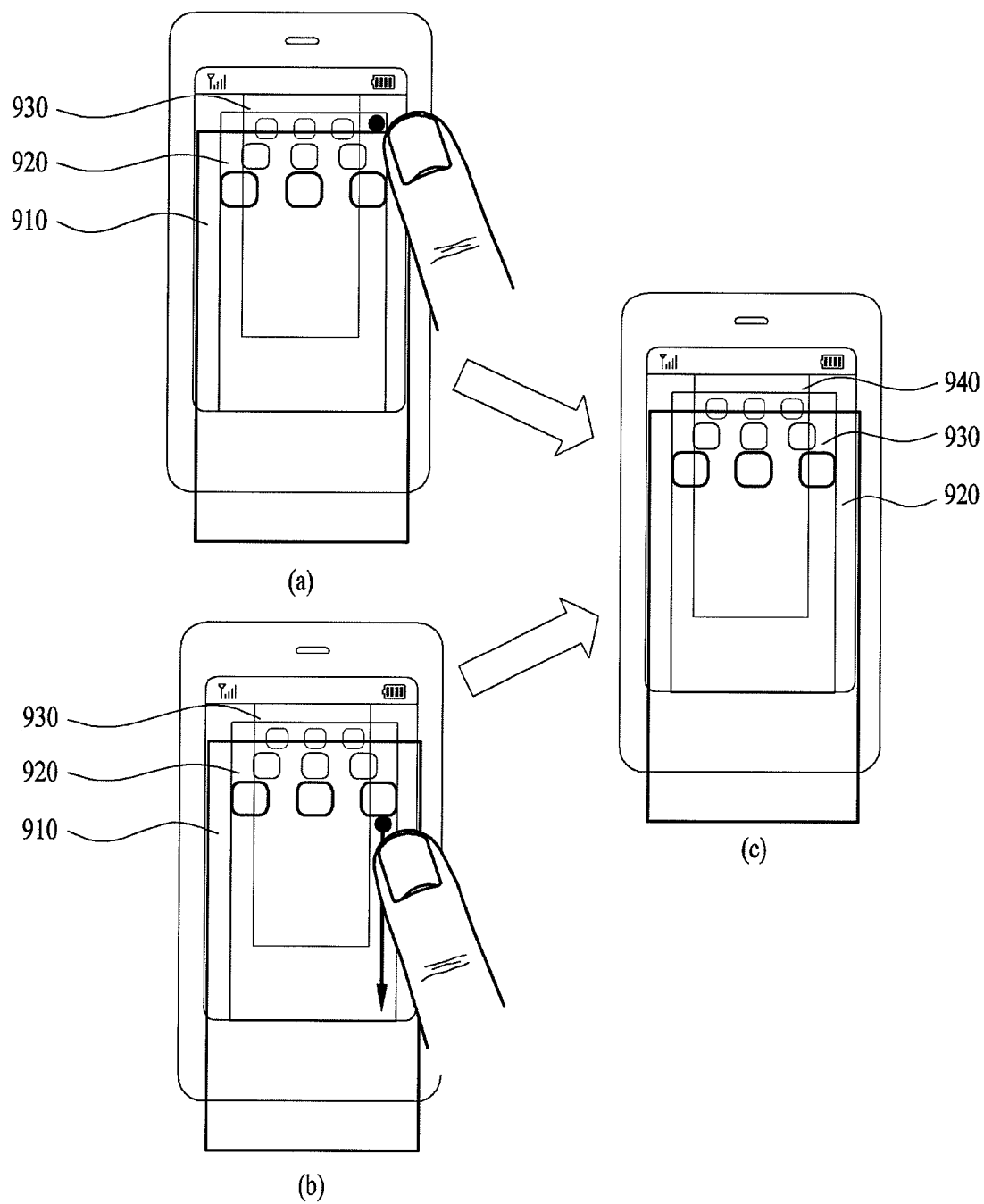
FIG. 9 illustrates an example of a method of changing a layer arrangement state in the spread mode according to one embodiment of the present invention.

FIG. 9 illustrates an example of a method of changing a layer arrangement state in the spread mode according to one embodiment of the present invention.

In FIG. 9, it is assumed that a layer stack, which includes four layers 910 to 940, is displayed in the spread mode and three layers are displayed in the spread mode at one time. Under the assumption, the user intends to change the arrangement state to allow the second layer 920 to be displayed as the highest layer.

To this end, the user applies a touch input to the layer 920 desired by himself/herself to be arranged as the highest layer, as illustrated in (a) of FIG. 9, or moves the current highest layer 910 through a touch input such as drag/flicking until the corresponding layer is not displayed on the touch screen as illustrated in (b) of FIG. 9, whereby the second layer 920 can be displayed as the highest layer as illustrated in (c) of FIG. 9. At this time, since three layers can be displayed at one time, the lowest layer 940 can be displayed additionally.

If the user arranges the third layer 930 as the highest layer in accordance with the method illustrated in (a) or (b) of FIG. 9 under the state (c) of FIG. 9, the existing highest layer 910 can be arranged again as the lowest layer in accordance with the circulating structure. Unlike this, in case of no circulating structure, the third layer 930 and the fourth layer 940 can only be displayed on the touch screen.

In the mean time, instead of the highest layer, another layer may be dragged to change the layer arrangement structure in the spread mode. This will be described with reference to FIG. 10.

Figure 10:
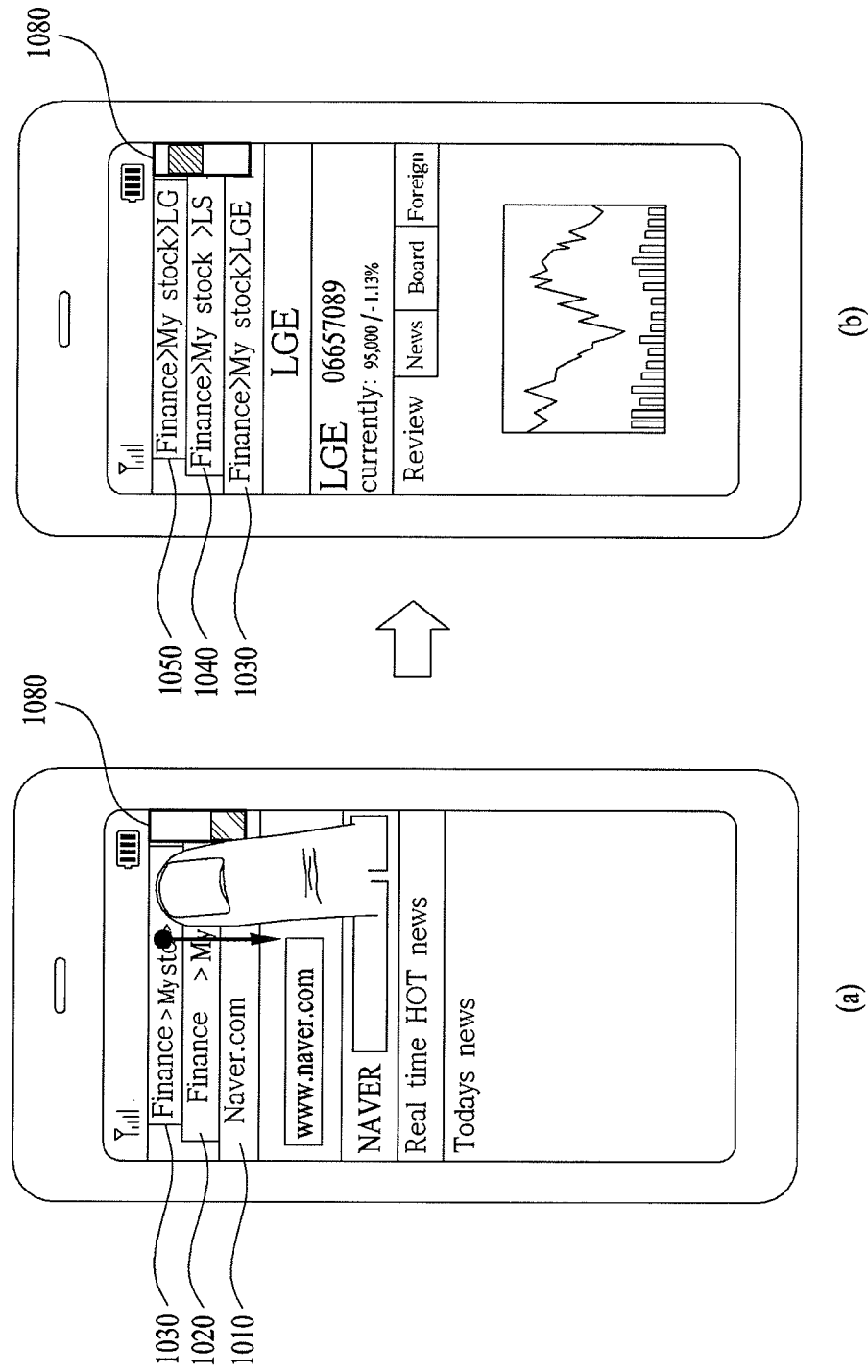
FIG. 10 illustrates another example of a method of changing a layer arrangement state in the spread mode according to one embodiment of the present invention.

FIG. 10 illustrates another example of a method of changing a layer arrangement state in the spread mode according to one embodiment of the present invention.

In FIG. 10, it is assumed that a layer stack, which includes five layers 1010 to 1050, is displayed in the spread mode and three layers are simultaneously displayed at one time. Also, it is assumed that one web page is displayed in one layer. Under the assumption, the user intends to change the arrangement state to allow the third layer 1030 to be displayed as the highest layer.

To this end, the user can move the layer 1030 desired by himself/herself to be arranged as the highest layer, as illustrated in (a) of FIG. 10. As a result, the third layer 1030 can be displayed as the highest layer as illustrated in (b) of FIG. 10. At this time, since three layers can be displayed at one time, the fourth layer 1040 and the fifth layer 1050 can be displayed additionally. In this case, a scroll bar 1080 indicating the relative location of the layer currently displayed among the layers included in the layer stack can be displayed in one zone of the touch screen, and the arrangement state of the layers can be changed even through a drag input applied to the scroll bar 1080.

Figure 11:
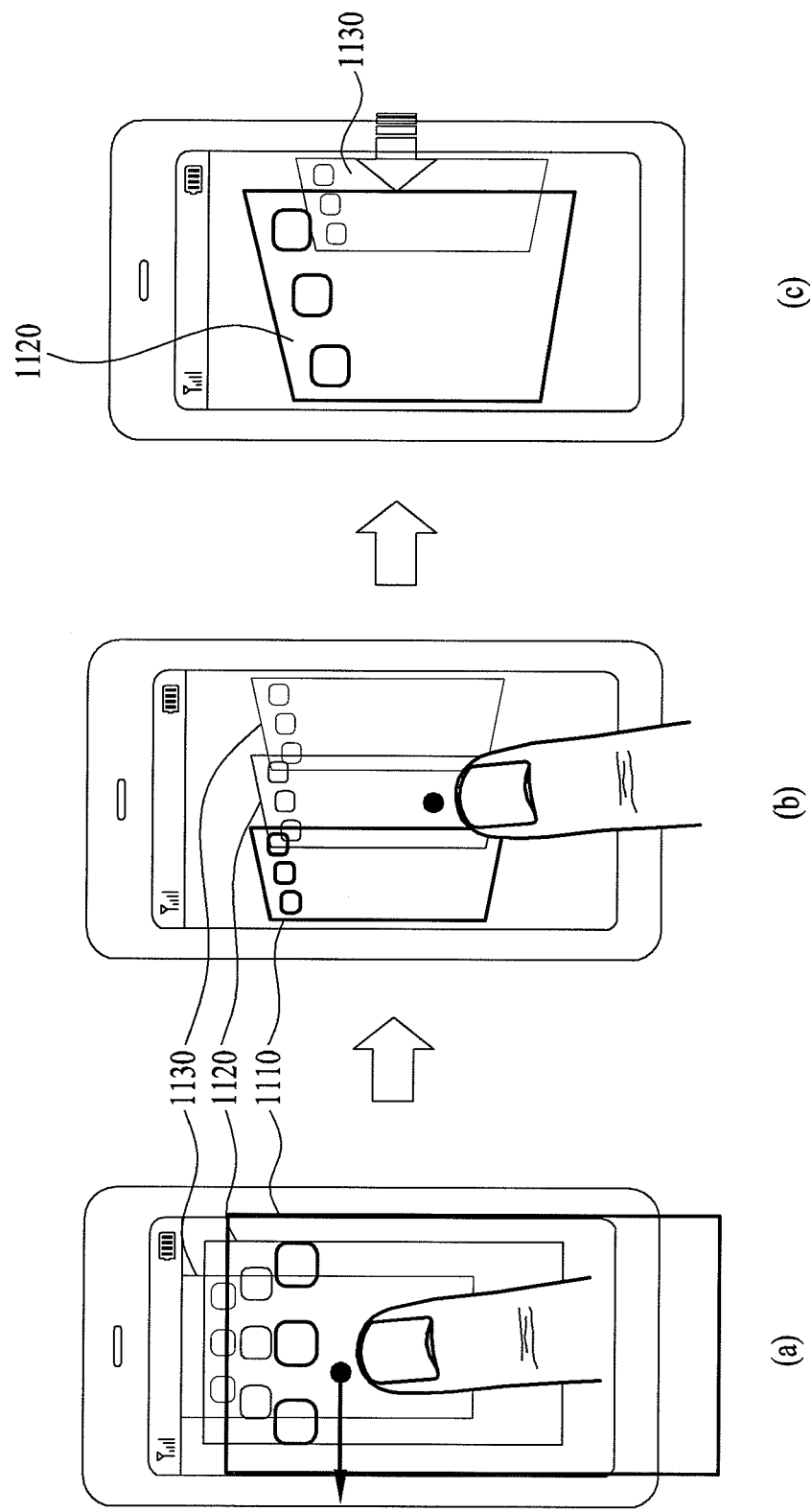
FIG. 11 illustrates other example of a method of changing a layer arrangement state in the spread mode according to one embodiment of the present invention.

FIG. 11 illustrates other example of a method of changing a layer arrangement state in the spread mode according to one embodiment of the present invention.

In FIG. 11, it is assumed that a layer stack, which includes three layers 1110 to 1130, is displayed in the spread mode and another layer stack adjacent to the corresponding layer stack in a horizontal direction does not exist, or scroll of a layer stack unit is not performed by drag/flicking input in a horizontal direction even if another layer stack exists.

First of all, as a drag input is applied to the left side in the spread mode as illustrated in (a) of FIG. 11, the arrangement state of the layers is changed in a tilted form in a horizontal direction as illustrated in (b) of FIG. 11. In this case, it is easier to identify the surfaces of the lower layers, and if the user selects the center layer 1120, the corresponding layer can be enlarged as illustrated in (c) of FIG. 11.

The drag input in a horizontal direction can be replaced with a tilt action of the mobile terminal in the horizontal direction. In this case, the mobile terminal is preferably provided with a sensing module 140 for sensing a tilt of the mobile terminal.

Next, a layer scroll in a general mode will be described.

Figure 12:
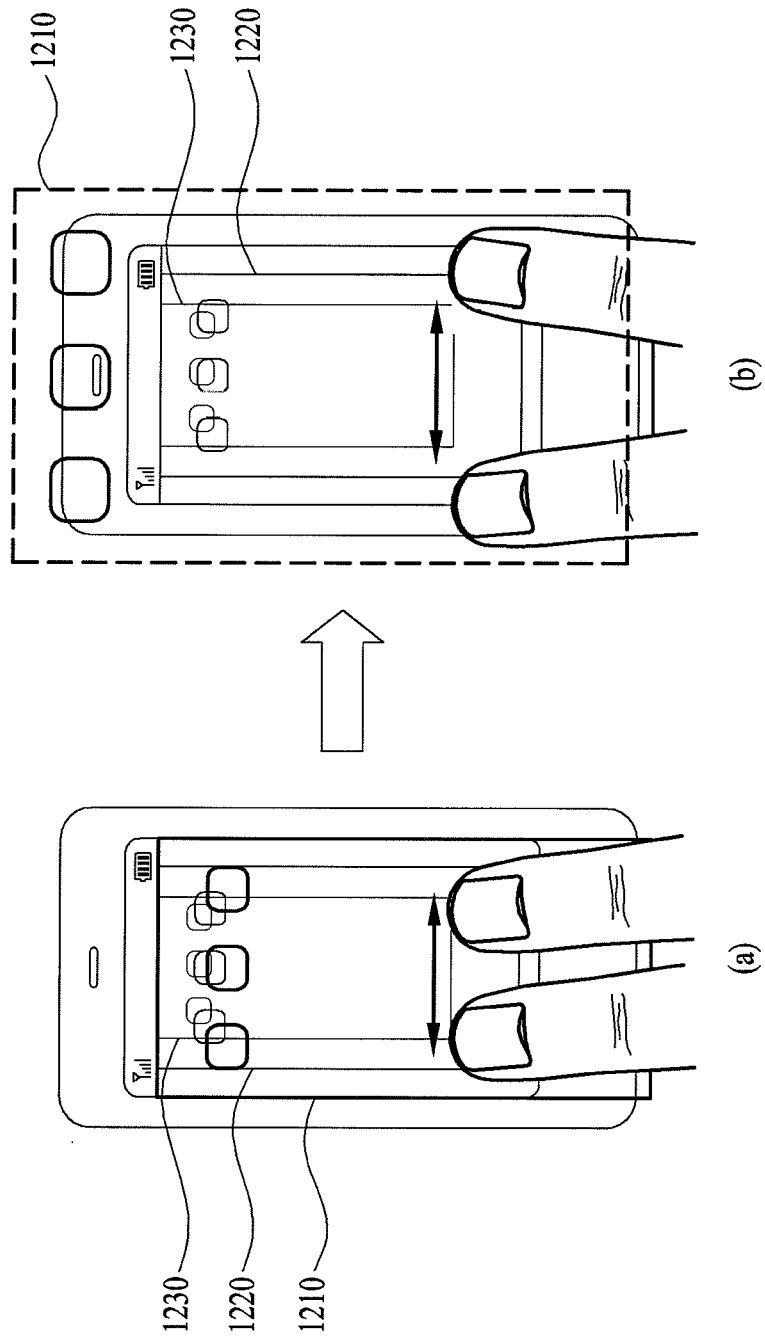
FIG. 12 illustrates an example of a method of scrolling a layer in a general mode of a user interface having a multi-layered structure according to one embodiment of the present invention.

FIG. 12 illustrates an example of a method of scrolling a layer in a general mode of a user interface having a multi-layered structure according to one embodiment of the present invention.

First of all, referring to (a) of FIG. 12, when a stack layer, which includes three layers 1210 to 1230, is displayed in a general mode not the spread mode, a multi-touch can be used to scroll the layers. In other words, in a state that a touch input is applied to two touch points on the touch screen, if the interval between the two touch points is far away from each other as illustrated in (b) of FIG. 12, the highest layer 1210 is gradually enlarged and transparency is increased. At this time, the second layer 1220 may be enlarged correspondingly. Afterwards, if the size or transparency of the highest layer exceeds a previously set range, the highest layer is not displayed any more, and the second layer 1220 becomes the highest layer.

By contrast, if a multi-touch input that makes the interval between the two touch points narrow is applied to the two touch points, the higher layer of the layer currently displayed as the highest layer is reduced and displayed with transparency. As a result, the existing highest layer can be reduced gradually.

If the aforementioned operation of FIG. 12 is implemented in a 3D stereoscopic image, a 3D depth of each layer can be changed to correspond to enlargement and reduction of the layer.

Next, a scroll of a layer stack unit will be described with reference to FIG. 13.

FIG. 13 illustrates an example of a scroll type of a layer stack unit according to one embodiment of the present invention.

In FIG. 13, it is assumed that three layer stacks from stack 1 to stack 3 are arranged in a horizontal direction to adjoin one another, and each layer stack includes three layers.

When the stack 2 is displayed in the spread mode as illustrated in (a) of FIG. 13, as the user applies a flicking touch input in a right direction, the stack 1 can be displayed on the touch screen as illustrated in (b) of FIG. 13. By contrast, if the user applies a flicking touch input in a left direction in the state of (a) of FIG. 13, the stack 3 can be displayed on the touch screen.

Generation and Deletion of Layer

Hereinafter, a method of adding and deleting a layer to and from a layer stack when the corresponding layer stack is displayed in the spread mode will be described.

First of all, a method of adding a layer will be described with reference to FIG. 14.

Figure 14:
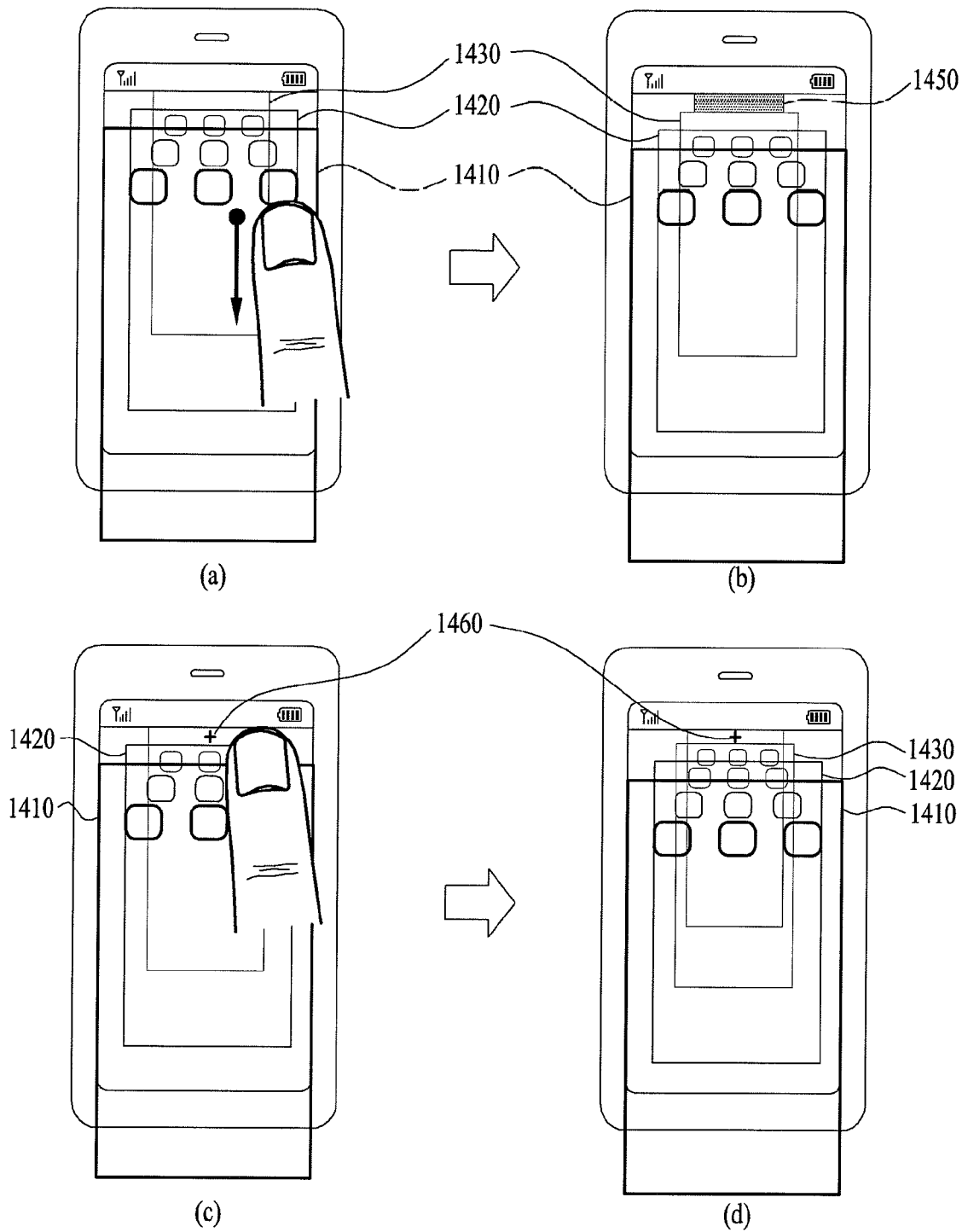
FIG. 14 illustrates an example of a method of adding a layer in the spread mode according to one embodiment of the present invention.

FIG. 14 illustrates an example of a method of adding a layer in the spread mode according to one embodiment of the present invention.

It is assumed that a layer stack, which includes three layers 1410 to 1430, is displayed in the spread mode as illustrated in (a) and (b) of FIG. 14, and a layer stack, which includes two layers 1410 and 1420, is displayed in the spread mode as illustrated in (c) and (d) of FIG. 14.

First of all, referring to (a) of FIG. 14, the user can apply a drag input in a downward direction to enter the spread mode. At this time, if a drag distance reaches a certain distance or more, a touch zone 1450 for adding a layer can be displayed on the lowest layer 1430 as illustrated in (b) of FIG. 14. The touch zone 1450 may be semi-transparent, and may gradually become opaque in proportion to the time when a touch input is applied to the corresponding touch zone. If the opaque level exceeds a predetermined range, a new layer may be generated in the touch zone 1450. If the touch input is released before the opaque level exceeds a predetermined range, generation of the layer may be omitted.

The touch zone for generating a layer may be provided in an opaque form 1460 as illustrated in (c) of FIG. 14, or may always be displayed without being deleted, as illustrated in (d) of FIG. 14, even after a new layer is generated.

In addition to the method of FIG. 14, a layer may be added through a general procedure of paging a menu.

Next, a method of deleting a layer will be described with reference to FIG. 15.

Figure 15:
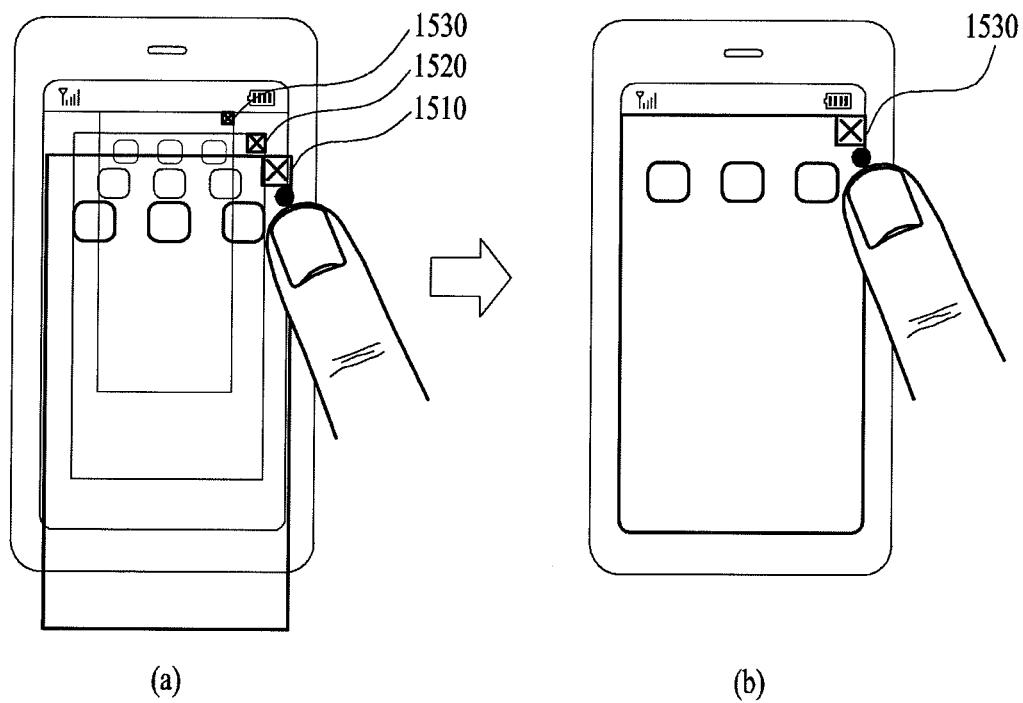
FIG. 15 illustrates an example of a method of deleting a layer in the spread mode according to one embodiment of the present invention.

FIG. 15 illustrates an example of a method of deleting a layer in the spread mode according to one embodiment of the present invention.

Referring to (a) of FIG. 15, a layer stack, which includes three layers 1510 to 1530, is displayed in the spread mode, wherein 'x' type icon for deleting a layer is displayed in one corner of each layer. The icon for deleting a layer may always be displayed in the spread mode, or may be displayed depending on a predetermined menu manipulation. At this time, as the user touches the icon for deleting the first layer 1510 and the second layer 1520, the corresponding layers are deleted in due order as illustrated in (b) of FIG. 15, and then the third layer 1530 may only be displayed.

Movement of Object in Layer/Stack Unit

Hereinafter, a method of moving an object existing on a random layer to another layer will be described with reference to FIG. 16. In this case, the object occupies a predetermined area on the layer, and includes objects such as icon of which arrangement can be changed, widget, gadget, shortcut, and application execution screen.

Figure 16:
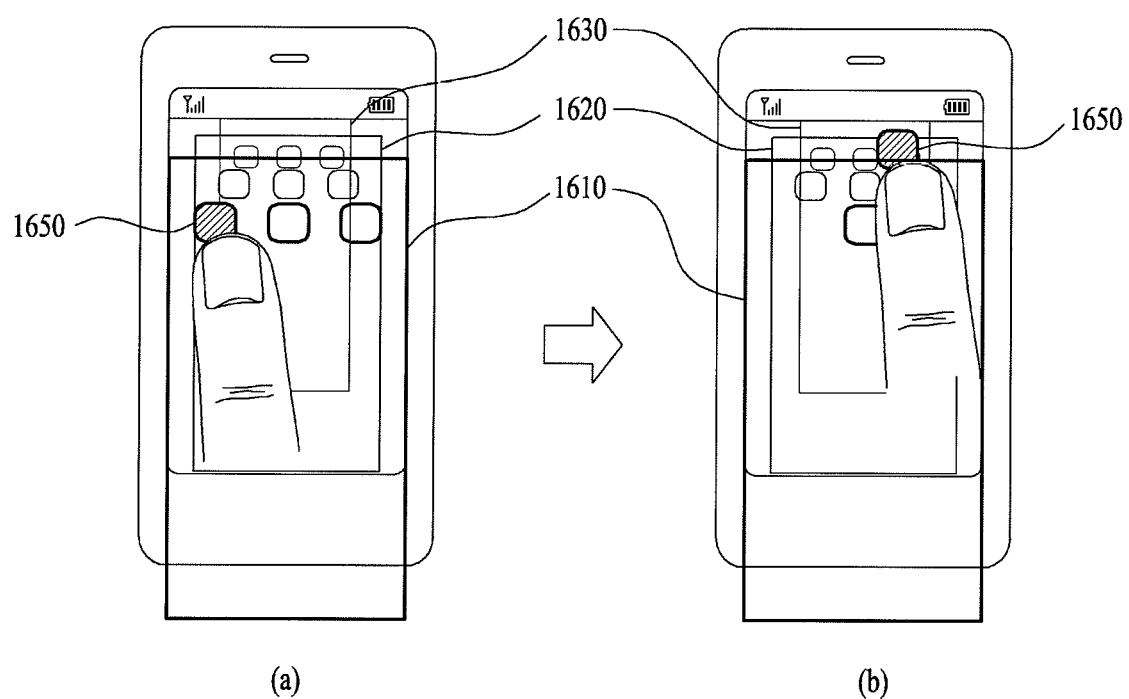
FIG. 16 illustrates an example of a method of moving an object between layers in the spread mode according to one embodiment of the present invention.

FIG. 16 illustrates an example of a method of moving an object between layers in the spread mode according to one embodiment of the present invention.

Referring to (a) of FIG. 16, a layer stack, which includes three layers 1610 to 1630, is displayed in the spread mode. At this time, in order to move an icon 1650, which is arranged in the highest layer 1610, to the second layer 1620, the user can select the corresponding icon 1650. Although the icon may be selected by a long touch input, this is exemplary. It is to be understood that the icon may be selected by another touch input.

If the icon 1650 is selected, the selected icon moves along a touch point until the touch is released. When the icon is located on the second layer 1620 as illustrated in (b) of FIG. 16, if the touch input is released, the corresponding icon 1650 may automatically be arranged in an empty space of the second layer 1620, or may be arranged at a point closest to the point where the touch is released. In this case, when the icon is moved, the layers except for the layer where the icon is currently located may be displayed opaquely for the user's visual comfort.

Next, a method of moving an object in a stack unit will be described with reference to FIG. 17.

Figure 17:
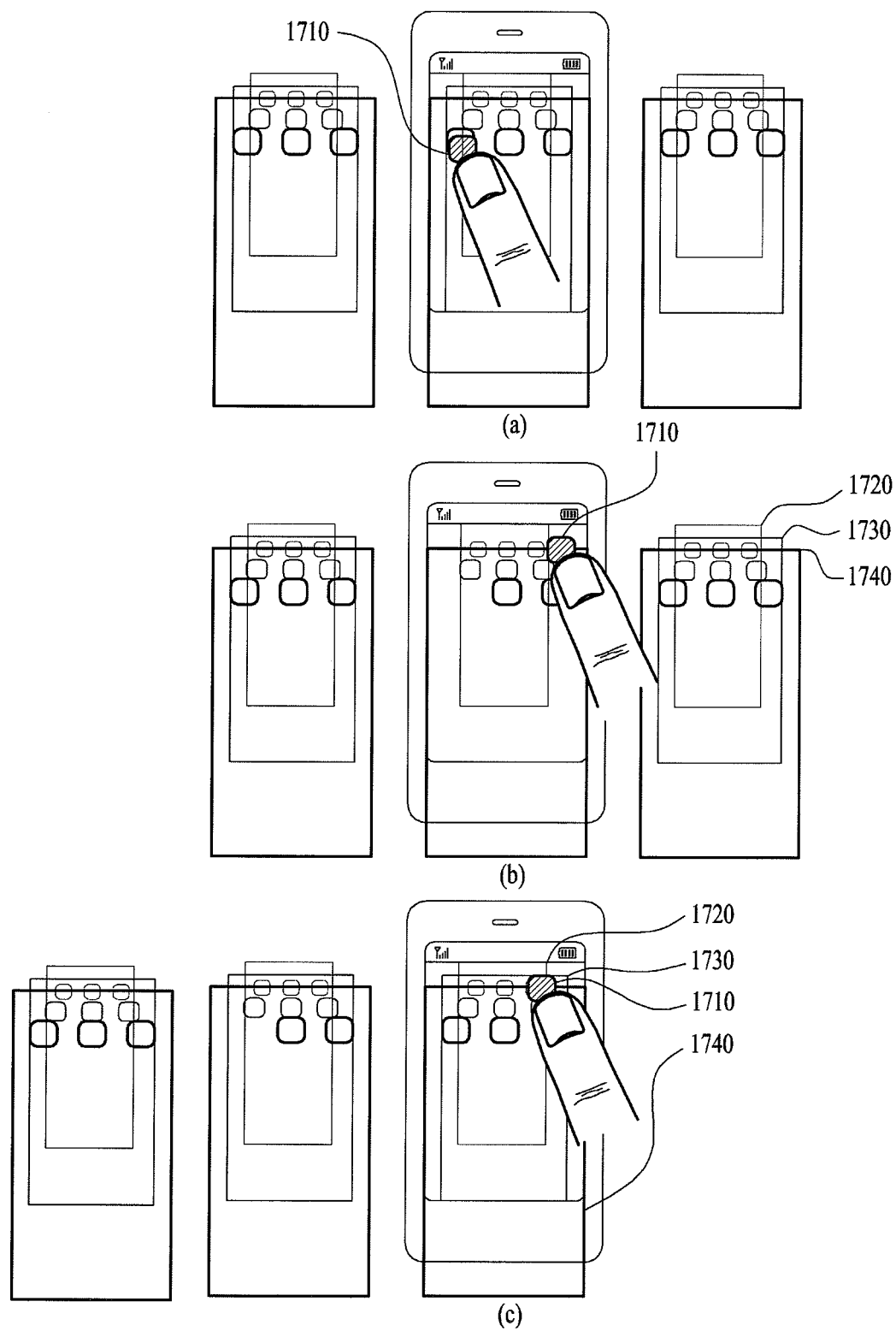
FIG. 17 illustrates an example of a method of moving an object between stacks in the spread mode according to one embodiment of the present invention.

FIG. 17 illustrates an example of a method of moving an object between stacks in the spread mode according to one embodiment of the present invention.

Referring to (a) of FIG. 17, three layer stacks, each of which includes three layers, are arranged in a horizontal direction to adjoin one another, and the center layer stack is displayed in the spread mode. At this time, the user can select an icon 1710 located in the highest layer of the center layer stack, move the selected icon 1710 to the right corner as illustrated in (b) of FIG. 17, and maintain the touch state for a constant time.

As a result, the right stack is scrolled as illustrated in (c) of FIG. 17 and then displayed on the touch screen in the spread mode. In a state that the right stack is displayed, after moving the icon 1710 to the second layer 1730, the user can move the icon 1710 to the second layer of the right layer stack by releasing the touch.

Use of Application of Spread Mode

Hereinafter, detailed examples that the aforementioned spread mode is applied to various applications will be described.

Figure 18:
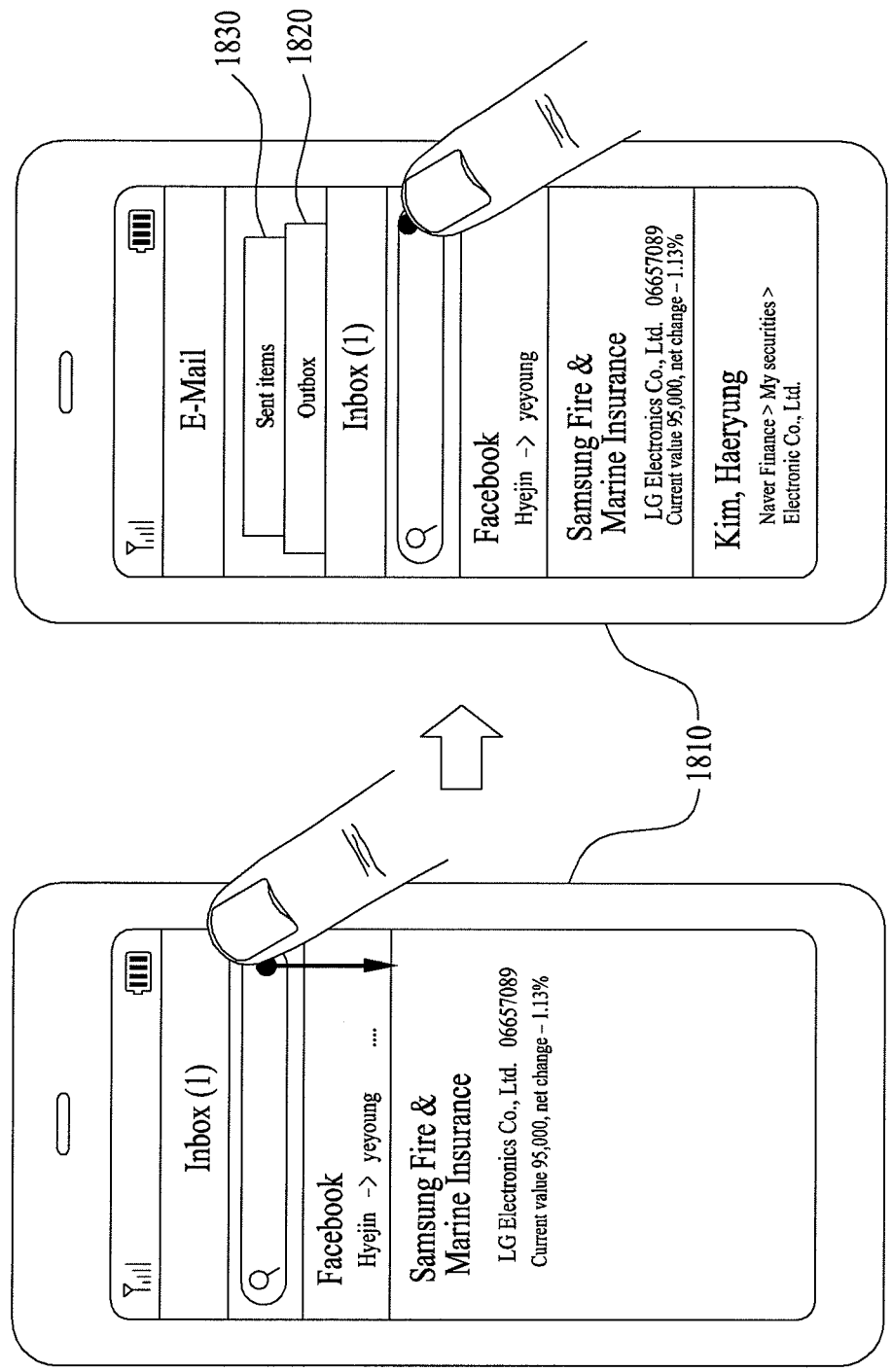
FIG. 18 illustrates an example of an spread mode applied to an email application in accordance with one embodiment of the present invention.

FIG. 18 illustrates an example of the spread mode applied to an email application in accordance with one embodiment of the present invention.

In FIG. 18, it is assumed that a user interface of a multi-layered structure is applied to an email application, which includes one layer stack, and list items such as receive mail box and send mail box are displayed separately in one layer.

When a layer 1810 provided with inbox is displayed on the touch screen as the highest layer as illustrated in (a) of FIG. 18, if a drag touch is input in a downward direction to enter the spread mode, a layer 1820 of outbox and a layer 1830 of sent item can be displayed together in the spread mode as illustrated in (b) of FIG. 18.

Figure 19:
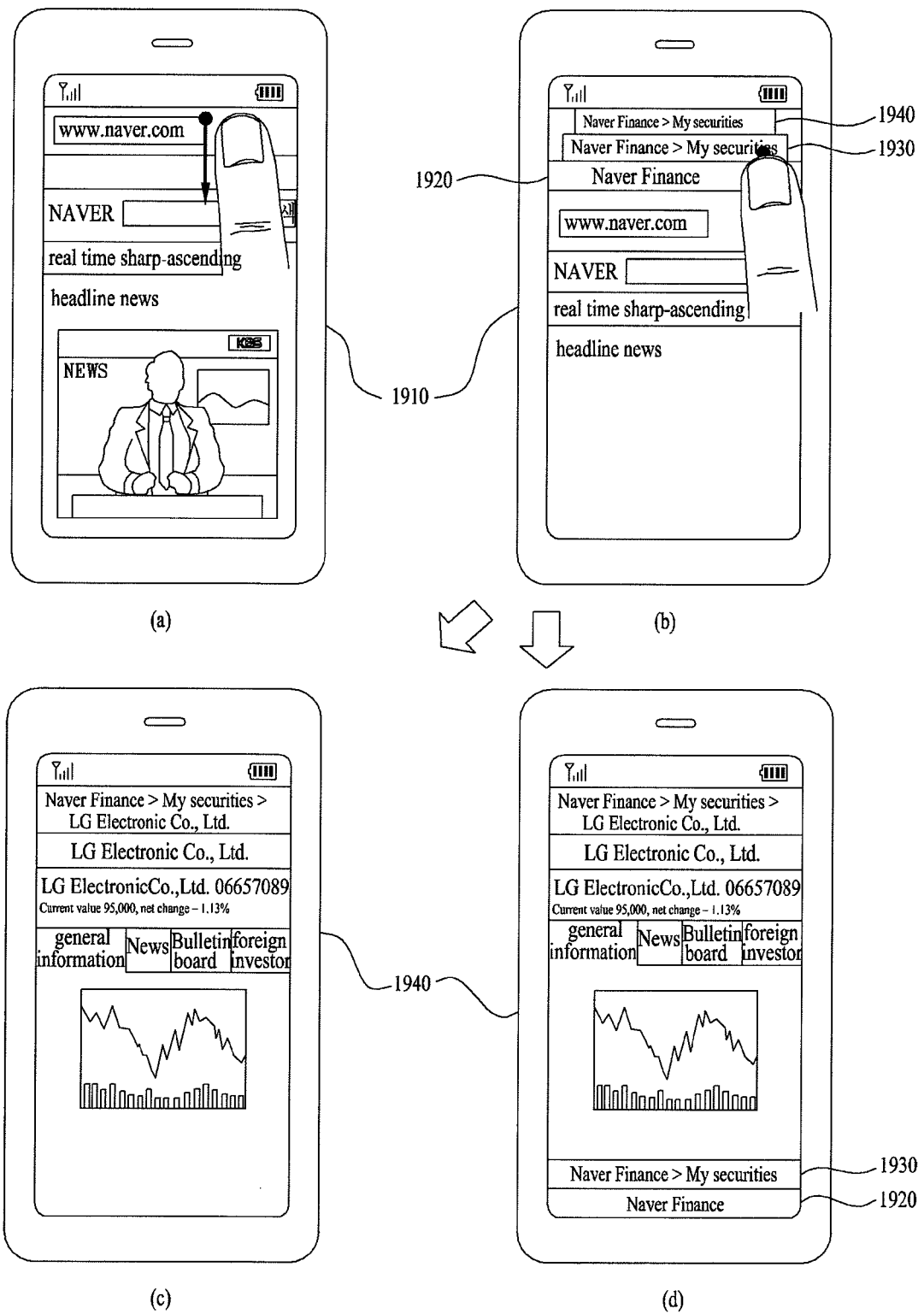
FIG. 19 illustrates an example of the spread mode applied to a web browser application in accordance with one embodiment of the present invention.

FIG. 19 illustrates an example of the spread mode applied to a web browser application in accordance with one embodiment of the present invention.

In FIG. 19, it is assumed that a user interface of a multi-layered structure is applied to a web browser application, which includes one layer stack, and each web page is displayed separately in one layer.

When a layer 1910 provided with a web page, which is currently browsed, is displayed on the touch screen as the highest layer as illustrated in (a) of FIG. 19, if a drag touch is input in a downward direction to enter the spread mode, web pages, which are previously browsed, are displayed in the spread mode in the form of lower layers 1920 to 1940 as illustrated in (b) of FIG. 19. At this time, the arrangement order of each layer can follow the time order. In other words, the layers corresponding to the web page previously browsed can be arranged in the order from the higher layers to the lower layers.

At this time, if the user touches the fourth layer 1940 or drags the third layer 1930 in a downward direction, the fourth layer 1940 can be displayed as the entire screen as illustrated in (c) of FIG. 19.

Alternatively, when the fourth layer 1940 is displayed as the entire screen, its higher layers 1920 and 1930 may be arranged below the touch screen at a predetermined size as illustrated in (d) of FIG. 19. At this time, if the layer arranged below the touch screen is selected again by the user, the selected layer can be displayed as the entire screen.

FIG. 20 illustrates another example of the spread mode applied to a web browser application in accordance with one embodiment of the present invention.

The same assumption as that of FIG. 19 is applied to FIG. 20. If a plurality of web browsers are executed in multi-tasking, a web browser additionally executed (for example, browsed by a new window) can be arranged by being connected with the existing web browser stack in a horizontal direction in the form a layer stack.

Referring to (a) of FIG. 20 under the aforementioned assumption, two web browsers are executed at the same time, whereby layer stacks 2010 and 2020 are generated per web browser and arranged to adjoin each other in a horizontal direction. At this time, the left layer stack 2010 is displayed on the touch screen in the spread mode. If the user inputs a flicking touch in a left direction to browse a web page displayed in the right layer stack, the right layer stack 2020 is displayed by being scrolled to the left side as illustrated in (b) of FIG. 20.

End of Spread Mode (Return to General Mode)

Hereinafter, a method of returning from the aforementioned spread mode to a general mode will be described.

Figure 21:
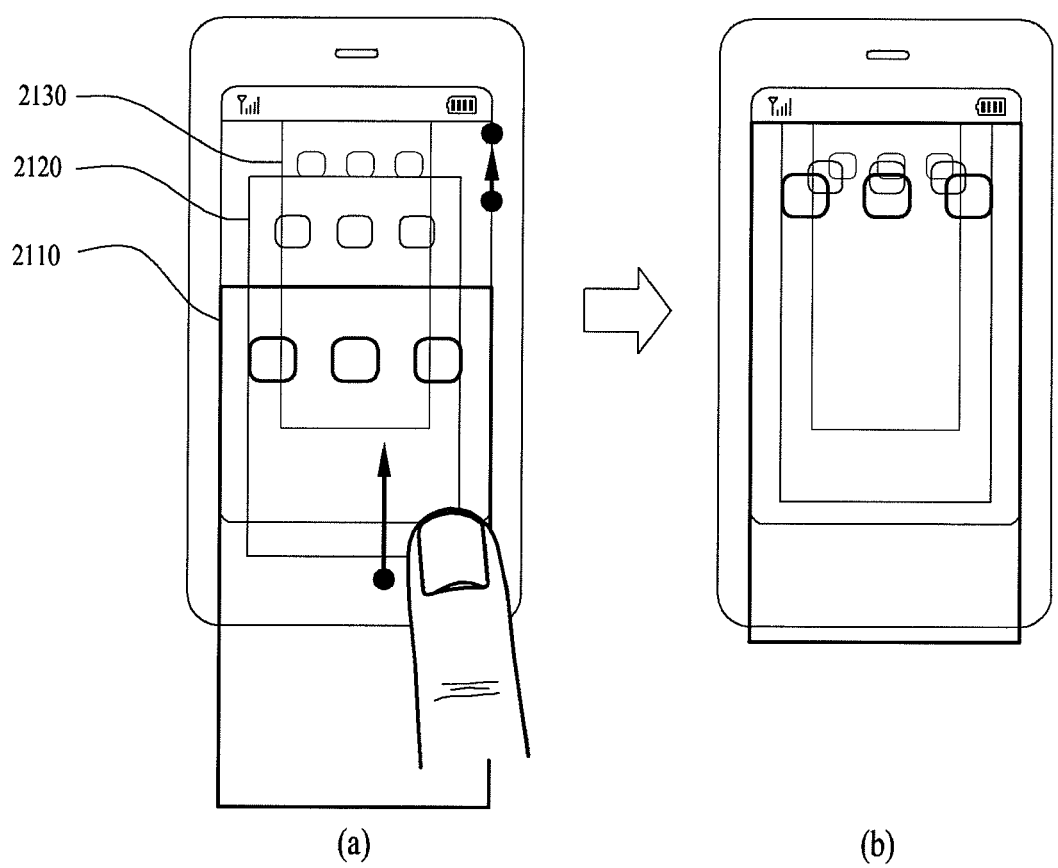
FIG. 21 illustrates an example of a method of ending the spread mode according to one embodiment of the present invention.

FIG. 21 illustrates an example of a method of ending the spread mode according to one embodiment of the present invention.

Referring to (a) of FIG. 21, a layer stack, which includes three layers 2110 to 2130, is displayed in the spread mode. At this time, the user can end the spread mode through a touch input opposite to a touch input for initiating the spread mode on the touch screen. For example, if this spread mode is initiated by inputting a drag touch in a downward direction as illustrated in (a) of FIG. 6 and the user inputs the drag touch on the touch screen in an upward direction, the spread mode can be ended as illustrated in (b) of FIG. 21.

In the mean time, a vertical touch is used for scroll in the spread mode in which layers are arranged on the same plane in a vertical direction as illustrated in FIG. 8. Accordingly, in this spread mode, another ending method is required. This will be described with reference to FIG. 22.

FIG. 22 illustrates another example of a method of ending the spread mode according to one embodiment of the present invention.

The same assumption as that of FIG. 8 is applied to FIG. 22, and it is assumed that (a) of FIG. 22 corresponds to the status subsequent to (c) of FIG. 8. Referring to (a) of FIG. 22, the user touches zones corresponding to different layers 2210 and 2220 with two fingers. Afterwards, as the user makes the interval between the two fingers (touch points) narrow as illustrated in (b) of FIG. 22 while maintaining the touch state, the spread mode can be ended as illustrated in (c) of FIG. 22.

In addition, the spread mode may be ended and the general mode may be displayed by manipulation of a general menu or a specific hardware key button (for example, home key).

In the mean time, in the aforementioned embodiments, the object arranged in the layer may occupy two or more layers continuously. An example of the object includes a stereoscopic map object. In more detail, a plane map may be displayed in the lower layer, and a stereoscopic building may be displayed in the higher layer.

Another example of the object includes an object, such as a file download icon, which changes and displays a layer depending on the ongoing status. In more detail, in a state that the icon is arranged in the lowest layer when downloading starts, the icon gradually moves to the higher layer as downloading is ongoing, whereby the icon can be arranged in the highest layer if downloading is finished.

Also, according to one embodiment of the present invention, the aforementioned method can be implemented as a code, which can be read by a processor, in a medium where a program is recorded. Examples of the medium include ROM, RAM, CD-ROM, magnetic tape, floppy disk, optical data memory, carrier wave (for example, transmission through Internet).

The aforementioned mobile terminal is not restricted by the configuration and method of the aforementioned embodiments. All or some of the aforementioned embodiments in combination can be configured selectively, whereby various modifications can be made in the embodiments.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a touch screen configured to display at least one layer of a stack, the stack comprising at least a first webpage layer, a second webpage layer and a third webpage layer; and
    a controller configured to:
        display the first webpage layer on the touch screen, wherein the first webpage layer is displayed as a highest layer of the stack without displaying the second webpage layer and the third webpage layer, and without displaying a touch zone for adding an additional webpage layer;
        in response to a first touch drag input reaching a predetermined distance in a downward direction on the first webpage layer, move the first webpage layer in the downward direction to display the second webpage layer and the third webpage layer, such that the first webpage layer, the second webpage layer and the third webpage layer are concurrently displayed together with the touch zone which is located above a displayed portion of the third webpage layer on the touch screen, wherein the third webpage layer is partially covered by the second webpage layer and the second webpage layer is partially covered by the first webpage layer, and wherein the displayed portion of the third webpage layer is located above a displayed portion of the second webpage layer on the touch screen, and the displayed portion of the second webpage layer is located above a displayed portion of the first webpage layer on the touch screen; and
        in response to a second touch drag input in the downward direction on the third webpage layer, cause the first webpage layer to disappear from the touch screen,
        wherein the additional webpage layer is added in addition to the first webpage layer, the second webpage layer and the third webpage layer in response to a touch input on the touch zone.

2. The mobile terminal of claim 1, wherein the controller is further configured to display the first webpage layer, the second webpage layer, and the third webpage layer in a tilted form.

3. The mobile terminal of claim 1, wherein the first webpage layer has a specific area including a Uniform Resource Locator (URL) box, and wherein the first touch drag input starts from the specific area including the URL box.

4. The mobile terminal of claim 1, wherein the controller is further configured to display a first icon on the first webpage layer for deleting the first webpage layer, a second icon on the second webpage layer for deleting the second webpage layer, and a third icon on the third webpage layer for deleting the third webpage layer.

5. The mobile terminal of claim 4, wherein each of the first icon, the second icon and the third icon is respectively displayed at an upper right corner of each of the first webpage layer, the second webpage layer, and the third webpage layer.

6. The mobile terminal of claim 4, wherein in response to touching the first icon and the second icon, the first webpage layer and the second webpage layer disappear such that the third webpage layer remains displayed together with the third icon.

7. The mobile terminal of claim 1, wherein in response to a touch input on the second webpage layer, the second webpage layer is displayed as an entire screen.

8. The mobile terminal of claim 1, wherein the first webpage layer is stacked over the second webpage layer, and the second webpage layer is stacked over the third webpage layer.

9. The mobile terminal of claim 1, wherein a first distance by which the first webpage layer is moved is longer than a second distance by which the second webpage layer is moved.

10. The mobile terminal of claim 1, wherein the controller is further configured to display a plurality of webpage layers including the first webpage layer and the second webpage layer on the touch screen, and
    wherein a spaced distance between the first webpage layer and the second webpage layer depends on a number of the plurality of webpage layers.

11. The mobile terminal of claim 1, wherein the controller is further configured to:
    in response to the first touch drag input in the downward direction, enter a spread mode to concurrently display the first webpage layer, the second webpage layer and the third webpage layer.

12. A method of controlling a mobile terminal, the method comprising:
    displaying a first webpage layer of a stack on a touch screen of the mobile terminal, wherein the stack comprises at least the first webpage layer, a second webpage layer and a third webpage layer, and wherein the first webpage layer is displayed as a highest layer of the stack without displaying the second webpage layer and the third webpage layer, and without displaying a touch zone for adding an additional webpage layer;
    in response to a first touch drag input reaching a predetermined distance in a downward direction on the first webpage layer, moving the first webpage layer in the downward direction to display the second webpage layer and the third webpage layer, such that the first webpage layer, the second webpage layer and the third webpage layer are concurrently displayed together with the touch zone which is located above a displayed portion of the third webpage layer on the touch screen, wherein the third webpage layer is partially covered by the second webpage layer and the second webpage layer is partially covered by the first webpage layer, and wherein the displayed portion of the third webpage layer is located above a displayed portion of the second webpage layer on the touch screen, and the displayed portion of the second webpage layer is located above a displayed portion of the first webpage layer on the touch screen; and
    in response to a second touch drag input in the downward direction on the third webpage layer, controlling the first webpage layer to disappear from the touch screen, wherein an additional webpage layer is added in addition to the first webpage layer, the second webpage layer and the third webpage layer in response to a touch input on the touch zone.

\* \* \* \* \*